(12) United States Patent
Rhee et al.

(10) Patent No.: US 9,942,302 B2
(45) Date of Patent: Apr. 10, 2018

(54) TERMINAL APPARATUS MOUNTABLE IN VEHICLE, MOBILE DEVICE FOR WORKING WITH THE TERMINAL APPARATUS, AND METHODS FOR PROVIDING SERVICE THEREOF

(71) Applicant: SAMSUNG ELECTRONICS CO., LTD., Suwon-si (KR)

(72) Inventors: Young-ho Rhee, Yongin-si (KR); Il-ku Chang, Seongnam-si (KR); Jae-hwan Kim, Suwon-si (KR); Sang-gon Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 662 days.

(21) Appl. No.: 14/226,230

(22) Filed: Mar. 26, 2014

(65) Prior Publication Data

US 2014/0297674 A1 Oct. 2, 2014

Related U.S. Application Data

(60) Provisional application No. 61/805,305, filed on Mar. 26, 2013.

(30) Foreign Application Priority Data

Sep. 17, 2013 (KR) .................. 10-2013-0111635

(51) Int. Cl.
*G06F 3/0482* (2013.01)
*H04L 29/08* (2006.01)
(Continued)

(52) U.S. Cl.
CPC ............ *H04L 67/025* (2013.01); *B60K 35/00* (2013.01); *B60K 37/06* (2013.01); *G01C 21/362* (2013.01);
(Continued)

(58) Field of Classification Search
CPC .... H04L 67/025; G06F 3/0485; G01C 21/362
(Continued)

(56) References Cited

U.S. PATENT DOCUMENTS 6,491,276 B1 * 12/2002 Belliveau ............ B60R 11/0252
108/138
7,251,507 B2 7/2007 Kitao et al.
(Continued)

FOREIGN PATENT DOCUMENTS

CN 102314640 A 1/2012
CN 102426504 A 4/2012
(Continued)

OTHER PUBLICATIONS

Communication, Issued by the European Patent Office, dated Sep. 1, 2014, in counterpart European Application No. 14155874.2.
(Continued)

*Primary Examiner* — Andrey Belousov
(74) *Attorney, Agent, or Firm* — Sughrue Mion, PLLC

(57) ABSTRACT

A mobile device is provided. The mobile device includes: a display; a communicator configured to communicate with a terminal apparatus which displays items classified into a plurality of groups in a form of a list; and when the mobile device is connected with the terminal apparatus for communication, a controller configured to hop over the groups of the items displayed on the terminal apparatus according to a touch manipulation which is performed on a screen of the display. Accordingly, the mobile device can provide various services by being interlocked with the terminal apparatus mounted in a vehicle.

19 Claims, 47 Drawing Sheets

(51) Int. Cl.

| | | |
|---|---|---|
| *G01C 21/36* | (2006.01) | |
| *G06F 3/0485* | (2013.01) | |
| *H04N 21/422* | (2011.01) | |
| *G06F 3/0488* | (2013.01) | |
| *G06F 17/30* | (2006.01) | |
| *H04M 1/60* | (2006.01) | |
| *H04N 21/41* | (2011.01) | |
| *H04N 21/414* | (2011.01) | |
| *H04N 21/436* | (2011.01) | |
| *H04N 21/4363* | (2011.01) | |
| *G06F 3/16* | (2006.01) | |
| *B60K 35/00* | (2006.01) | |
| *B60K 37/06* | (2006.01) | |
| *H04M 1/725* | (2006.01) | |

(52) U.S. Cl.
CPC ....... *G01C 21/3688* (2013.01); *G06F 3/0482* (2013.01); *G06F 3/0485* (2013.01); *G06F 3/0488* (2013.01); *G06F 3/04883* (2013.01); *G06F 3/167* (2013.01); *G06F 17/30386* (2013.01); *H04M 1/6083* (2013.01); *H04N 21/4122* (2013.01); *H04N 21/41407* (2013.01); *H04N 21/42224* (2013.01); *H04N 21/43615* (2013.01); *H04N 21/43632* (2013.01); *H04N 21/43637* (2013.01); *H04M 1/6091* (2013.01); *H04M 1/72533* (2013.01); *H04M 2250/22* (2013.01)

(58) Field of Classification Search
USPC ........................................ 715/764, 863, 734
See application file for complete search history.

(56) References Cited

U.S. PATENT DOCUMENTS

| | | | |
|---|---|---|---|
| 9,747,016 B2 | 8/2017 | Miyazaki | |
| 2002/0032048 A1 | 3/2002 | Ono et al. | |
| 2004/0066968 A1* | 4/2004 | Glickman | H04N 1/646 382/166 |
| 2004/0193420 A1 | 9/2004 | Kennewick et al. | |
| 2005/0022130 A1 | 1/2005 | Fabritius | |
| 2007/0178944 A1 | 8/2007 | Mitsuru et al. | |
| 2007/0219706 A1 | 9/2007 | Sheynblat | |
| 2009/0012955 A1 | 1/2009 | Chu et al. | |
| 2009/0158203 A1 | 6/2009 | Kerr et al. | |
| 2010/0191466 A1 | 7/2010 | Deluca et al. | |
| 2011/0047466 A1* | 2/2011 | Michelman | G06F 9/4443 715/734 |
| 2011/0072388 A1 | 3/2011 | Merrell et al. | |
| 2011/0131515 A1* | 6/2011 | Ono | G01C 21/367 715/764 |
| 2011/0161003 A1 | 6/2011 | Fukuda et al. | |
| 2011/0205153 A1 | 8/2011 | Ueda et al. | |
| 2011/0258267 A1 | 10/2011 | Tozaki | |
| 2012/0010805 A1 | 1/2012 | Wilkerson | |
| 2012/0030634 A1 | 2/2012 | Miyazaki | |
| 2012/0146918 A1* | 6/2012 | Kreiner | H04M 1/7253 345/173 |
| 2012/0197523 A1 | 8/2012 | Kirsch | |
| 2013/0050271 A1 | 2/2013 | Kim et al. | |
| 2014/0300561 A1 | 10/2014 | Waller et al. | |
| 2017/0315690 A1 | 11/2017 | Miyazaki | |

FOREIGN PATENT DOCUMENTS

| | | |
|---|---|---|
| DE | 10 2011 110 978 A1 | 2/2013 |
| EP | 1113409 A1 | 7/2001 |
| JP | 2010071656 A | 4/2010 |
| JP | 2011-203982 A | 10/2011 |
| KR | 10-0468016 B1 | 1/2005 |
| WO | 2008027809 A2 | 3/2008 |

OTHER PUBLICATIONS

Communication dated Dec. 17, 2014 issued by the European Patent Office in counterpart European Patent Application No. 14155874.2.
"2012 Navigation System with Entune Quick Reference Guide" Jan. 1, 2012; XP055156982; http://www.toyota.com/t3Portal/document/omnav/OMENTQRG/pdf/OMENTORG.pdf.
Written Opinion dated May 22, 2014 issued by the International Searching Authority for International Application PCT/KR2014/001350.
Search Report dated May 22, 2014 issued by the International Searching Authority for International Application PCT/KR2014/001350.
Communication dated Jan. 29, 2018 by the State Intellectual Property Office of P.R. China in counterpart Chinese Patent Application No. 201410113520.3.

* cited by examiner

«TERMINAL APPARATUS MOUNTABLE IN VEHICLE, MOBILE DEVICE FOR WORKING WITH THE TERMINAL APPARATUS, AND METHODS FOR PROVIDING SERVICE THEREOF

CROSS-REFERENCE TO RELATED APPLICATION

This application claims priority from U.S. Provisional Patent Application No. 61/805,305, filed on Mar. 26, 2013 in the United States Patent and Trademark Office, and Korean Patent Application No. 10-2013-0111635, filed on Sep. 17, 2013 in the Korean Intellectual Property Office, the disclosure of which is incorporated herein by reference in their entirety.

BACKGROUND

1. Field

Apparatuses and methods consistent with exemplary embodiments relate to a vehicle mounted system and a mobile device connected therewith, and a method for providing services thereof, and more particularly, to a vehicle mounted system and a mobile device which are connected with each other for communication and thus provide various services, and a method for providing services thereof.

2. Description of the Related Art

With the development of electronic technologies, various kinds of mobile devices have been developed and distributed. The mobile devices provide various services such as calling, mailing, web surfing, etc. using a variety of hardware or software elements provided therein.

However, when the mobile device is implemented as using a portable device, the number, size or kind of hardware elements mountable in the device are inevitably limited. Therefore, the kind of service that can be provided by the mobile device is also limited.

In recent years, a vehicle mounted system that can provide various services such as a navigation function or a multimedia content playback function may be mounted in a means of transportation such as a vehicle. Such a vehicle mounted system may provide various convenient functions to users of the vehicles. However, the vehicle mounted system also puts a limit to the kind of service that it can provide due to the limit of its hardware and software elements.

Therefore, there is a need for a method for providing a variety of services by interlocking a vehicle mounted system and a mobile device with each other.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a vehicle mounted system and a mobile device connectible therewith, and a method for providing services using the same, which may improve user's convenience and satisfaction.

According to an aspect of an exemplary embodiment, there is provided a mobile device including: a display; a communicator configured to communicate with a terminal apparatus which displays items classified into a plurality of groups in a form of a list; and, when the mobile device is connected with the terminal apparatus for communication, a controller configured to hop over the groups of the items displayed on the terminal apparatus according to a touch manipulation which is performed on a screen of the display.

When a predetermined first touch manipulation is performed on the screen of the display, the controller may control the terminal apparatus to hop from the group of the items displayed on a screen of the terminal apparatus to a previous group or a next group, and to display an item belonging to the hopped to group.

When a predetermined second touch manipulation is performed on the screen of the display, the controller may change a mode to a handwriting recognition mode, and, when a text is drawn on the screen of the display in the handwriting recognition mode, the controller may control the terminal apparatus to hop to a group corresponding to the text and display an item belonging to the hopped to group.

When a mode is changed to the handwriting recognition mode, the controller may display an affordance GUI to guide the user to perform user drawing on the display.

When user drawing is not input for a predetermined time after the mode is changed to the handwriting recognition mode, the controller may return to a touch control mode in which the terminal apparatus is controlled according to the first touch manipulation.

The mobile device may further include a storage configured to store metadata including location information. The controller may provide the metadata to the terminal apparatus such that a service screen based on the location information of the metadata is displayed on the terminal apparatus.

The mobile device may further include a voice receiver configured to receive input of a user voice. When the user voice is input, the controller may set a search criterion differently according to a user state, search for at least one destination corresponding to the user voice using the set search criterion, and provide a result of the searching to the terminal apparatus through the communicator.

When the user is driving a vehicle, the controller may set a search criterion so that a destination providing a service related to the vehicle is searched first.

The mobile device may further include a storage configured to store user schedule information. The controller may check a next schedule of the user based on the user schedule information, and, when there is the next schedule, the controller may set a search criterion so that the destination is searched according to a time or a place of the next schedule.

When address information is received from the terminal apparatus, the controller may access a server apparatus corresponding to the address information, receive web page data, configure an adaptive screen for the terminal apparatus using the web page data, and provide the screen to the terminal apparatus through the communicator.

According to an aspect of another exemplary embodiment, there is provided a method for controlling a terminal apparatus of a mobile device, the method including: communicating with a terminal apparatus which displays items classified into a plurality of groups in a form of a list; sensing a touch manipulation performed on a screen of a display provided on the mobile device; and controlling to hop over the groups of the items displayed on the terminal apparatus according to the touch manipulation.

The controlling may include, when a predetermined first touch manipulation is sensed, controlling the terminal apparatus to hop from the group of the items displayed on a screen of the terminal apparatus to a previous group or a next group, and to display an item belonging to the hopped to group.

The controlling may include: when a predetermined second touch manipulation is sensed, changing a mode to a handwriting recognition mode; and when a text is drawn on the screen of the display in the handwriting recognition mode, controlling the terminal apparatus to hop to a group corresponding to the text and display an item belonging to the hopped to group.

The method may further include, when a mode is changed to the handwriting recognition mode, displaying an affordance GUI to guide the user to perform user drawing on the display.

The method may further include, when user drawing is not input for a predetermined time after the mode is changed to the handwriting recognition mode, retuning to a touch control mode.

The method may further include providing metadata including location information to the terminal apparatus, and displaying a service screen based on the location information of the metadata on the terminal apparatus.

The method may further include: receiving input of a user voice; setting a search criterion differently according to a user state; searching for at least one destination corresponding to the user voice using the set search criterion; and providing a result of the searching to the terminal apparatus.

The setting the search criterion may include, when the user is driving a vehicle, setting a search criterion so that a destination providing a service related to the vehicle is searched first.

The setting the search criterion may include, when there is a next schedule of the user, setting a search criterion so that the destination is searched according to a time or a place of the next schedule.

The method may further include: when address information is received from the terminal apparatus, accessing a server apparatus corresponding to the address information, and receiving web page data; and configuring an adaptive screen for the terminal apparatus using the web page data, and providing the screen to the terminal apparatus.

According to an aspect of another exemplary embodiment, there is provided a terminal apparatus configured to interlock with a mobile device, the terminal apparatus including: a display; a communicator configured to communicate with a mobile device; and a controller configured to cause the communicator to communicate with the mobile device and to cause one or more applications to be executed and to cause the display to display the results of the one or more executed applications. The one or more applications may be stored on the mobile device.

One or more applications may be stored on an application server and the controller may be further configured to access the application server through the mobile device.

The terminal apparatus may be mounted in a vehicle.

According to the various exemplary embodiments described above, the user can use various services by establishing communication between the vehicle mounted system and the mobile device. Accordingly, the user's convenience and satisfaction can be improved.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION

Figure 1:
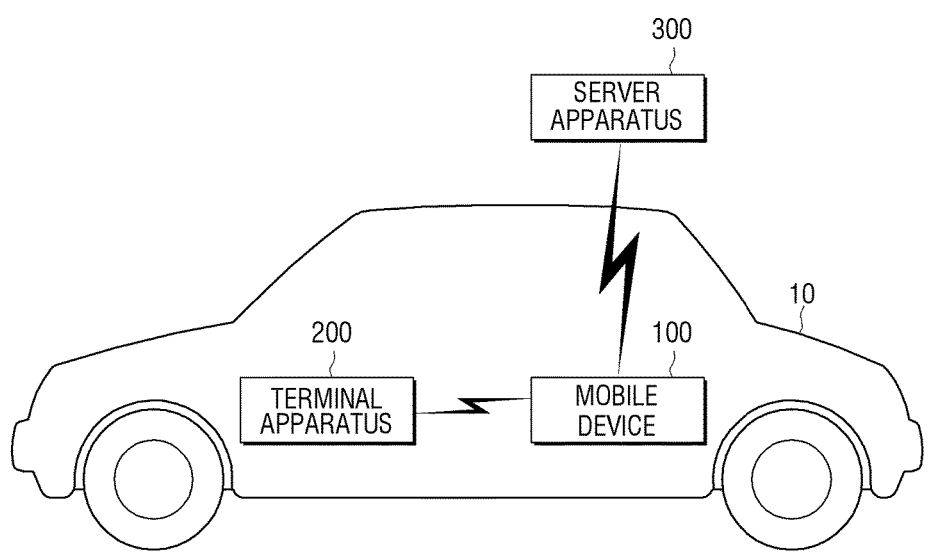
FIG. 1 is a view illustrating a configuration of a vehicle control system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a view illustrating a configuration of a vehicle control system according to an exemplary embodiment. Referring to FIG. 1, the vehicle control system includes a mobile device 100, a terminal apparatus 200, and a server apparatus 300.

The mobile device 100 refers to various kinds of devices that can be carried and used by users. Specifically, the mobile device 100 can be various portable devices such as a mobile phone, a tablet personal computer (PC), a laptop PC, a personal digital assistant (PDA), an MP3 player, an electronic organizer, etc. The mobile device 100 may communicate with the terminal apparatus 200 or the server apparatus 300. Although only one mobile device 100 is illustrated in FIG. 1, a plurality of mobile devices 100 may be included in the system.

The terminal apparatus 100 refers to a system that is mounted in a means of transportation such as a vehicle 10 and provides a variety of services. Alternatively, the terminal apparatus 100 may be called a vehicle head unit, a center fascia, a vehicle control system, a vehicle control apparatus, or a multimedia apparatus, etc. Hereinafter, however, the terminal apparatus 100 will be used throughout the specification for convenience of explanation. Also, although the terminal apparatus 100 is mounted in the car in FIG. 1, this should not be considered as limiting. The terminal apparatus 100 may be mounted and used in other means of transportation such as a cycle, a motor cycle, a ship, or an airplane, etc. Also, the terminal apparatus may be mountable in a means of transportation. Also, the terminal apparatus may not be mounted in any means of transportation.

The server apparatus 300 communicates with the mobile device 100 and exchanges various signals with the mobile device 100. The server apparatus 300 may be an apparatus that is connected with the mobile device 100 through various networks, such as a web server, a communications operator server, a cloud server, etc. When the terminal apparatus 200 is equipped with its own communicator, the server apparatus 300 may communicate with the terminal apparatus 200.

On the other hand, the mobile device 100 and the terminal apparatus 200 are connected to each other in various communication methods and communicate with each other.

Figure 2:
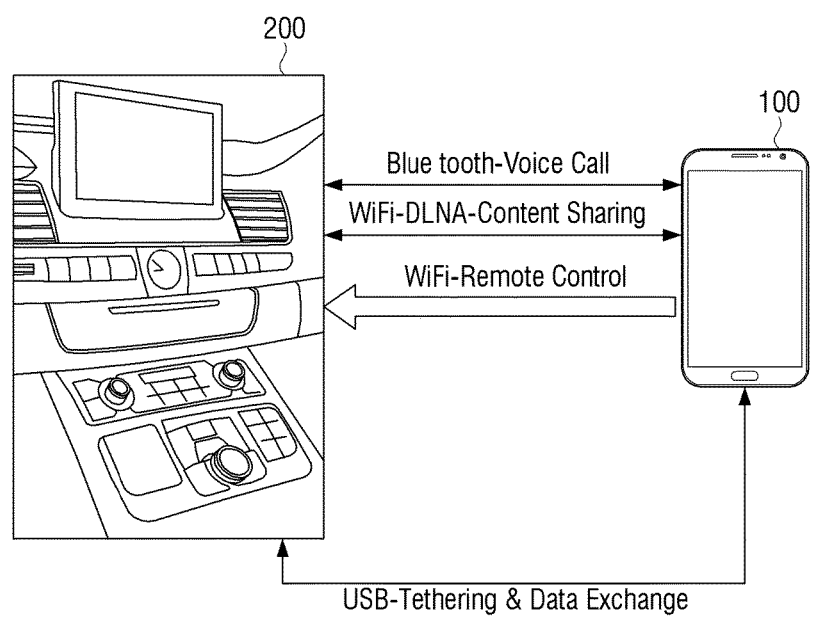
FIG. 2 is a view illustrating communication between a terminal apparatus and a mobile device according to one or more exemplary embodiments.

FIG. 2 is a view illustrating a detailed method for connecting the terminal apparatus 200 and the mobile device 100 for communication according to one or more exemplary embodiments.

Referring to FIG. 2, the terminal apparatus 200 may include various apparatuses such as hands free kits (HFK), a navigation apparatus, a multimedia playback apparatus, etc. Each apparatus may be placed on an appropriate location of an interior of a means of transportation. The terminal apparatus 200 may exchange various signals, data, or contents with the mobile device 100 in various communication methods such as Bluetooth, Wi-Fi, and universal serial bus (USB) etc.

Specifically, when the mobile device 100 receives or transmits a call, the hands free kit of the terminal apparatus 200 is connected with the mobile device 100 in the Bluetooth method. When the mobile device 100 receives a voice signal uttered by a person on the other end of the line and outputs the voice signal to the hands free kit, the hands free kit amplifies the voice signal, and converts and outputs it through various speakers (not shown) mounted in the vehicle. Also, the hands free kit amplifies the converted voice signal through a microphone (not shown) mounted in the vehicle and transmits the voice signal to the mobile device 100, thereby transmitting the voice to the person on the other end of the line. Accordingly, the user can talk without holding the mobile device 100 while driving.

Also, the mobile device 100 may exchange various data with the terminal apparatus 200 in the Wi-Fi method. Specifically, the mobile device 100 may execute a digital living network alliance (DLNA) function and may provide contents to the terminal apparatus 200. The terminal apparatus 200 may receive various contents from the mobile device 100. Accordingly, the terminal apparatus 200 may display various contents screens through a display embedded therein.

Also, the terminal apparatus 200 may receive a control signal from the mobile device 100 in Bluetooth, Wi-Fi, and other various wire/wireless communication methods. The terminal apparatus 200 may perform various control operations according to the received control signal.

Also, the terminal apparatus 200 may be connected with the mobile device 100 through an interface like a USB and may perform a tethering function and may exchange other data and signals.

As shown in FIGS. 1 and 2, the mobile device 100 may be interlocked with the terminal apparatus 200 and the server 300 and may provide various services.

Hereinafter, various services that can be provided by this system will be explained according to exemplary embodiments.

Figure 3:
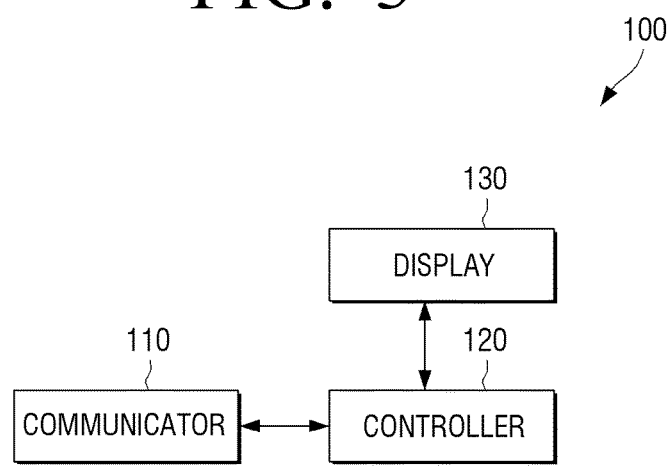
FIG. 3 is a block diagram illustrating a configuration of a mobile device according to an exemplary embodiment.

FIG. 3 is a block diagram illustrating a configuration of a mobile device according to an exemplary embodiment. Referring to FIG. 3, a mobile device 100 includes a communicator 110, a controller 120, and a display 130.

The display 130 is an element for displaying various screens. The display 130 may be implemented in appropriate size and shape so that it can be mounted in the mobile device 100. The display 130 may be implemented by using various types of displays such as a liquid crystal display (LCD), an organic light emitting diode (OLED) display, a plasma display panel (PDP), etc. according to a kind of the mobile device 100. Also, the display 130 may include a driving circuit which may be implemented by using an a-si TFT, a low temperature poly silicon (LTPS) TFT, an organic TFT (OTFT), etc, and a backlight unit.

The communicator 110 is an element for communicating with various external apparatuses including the terminal apparatus 200. The communicator 110 may communicate with the external apparatuses in various wireless communication methods such as Wi-Fi, Bluetooth, Zigbee, $3^{rd}$ Generation (3G), $3^{rd}$ generation partnership project (3GPP), long term evolution (LTE), near field communication (NFC), etc., or in various wire communication methods such as a USB, a serial interface, etc.

When the mobile device 100 is connected with the terminal apparatus 200 for communication through the communicator 110, the controller 120 operates in a touch control mode. The touch control mode refers to a mode in which the operation of the terminal apparatus is controlled according to a touch manipulation made on a screen of the display 130. The touch manipulation may include various manipulations such as simple touch, double touch, multi-touch, touch and drag, touch and flick, and drawing etc. The simple touch refers to touching the screen of the display 130. The double touch refers to touching twice in a row, and the multi-touch refers to touching a plurality of points simultaneously. The touch and drag refers to touching the screen of the display and then moving the touched point while still touching, and the touch and flick refers to touching the screen, moving in one direction rapidly while still touching, and then raising user's finger. The drawing refers to touching the screen and drawing a symbol, a character, a sign, and a number. Although various forms of touch control have been described, one or more exemplary embodiments are not limited to these touch modes.

In the touch control mode, the controller 120 may sense the user's touch manipulation using a touch sensor embedded in a lower portion of the display 130. The touch sensor may be implemented by using various types of sensors such as a capacitive sensor, a resistive sensor, and a piezoelectric sensor. When the user touches a certain point on the screen of the display 130, the controller 120 detects x, y coordinate values of the touch point. Accordingly, the controller 120 may determine which menu is selected on the screen. Also, when the x, y coordinate values are changed, the controller 120 detects the changed coordinate values continuously and confirm a touch trace. Accordingly, the controller 120 may sense touch and drag, touch and flick, and drawing.

When the touch manipulation is sensed as described above, the controller 120 may transmit a control signal corresponding to the touch manipulation to the terminal apparatus 200.

For example, when the terminal apparatus 200 displays items which are classified into a plurality of groups and arranged in the form of a list, a first touch manipulation to hop over one or more groups may be performed on the screen of the display 130. The item recited herein may be a variety of information that is stored in the terminal apparatus 200, the mobile device 100 or the external server apparatus 300, such as contact information, user information, address information, photos, location information, advertisement information, product information, and applications. The items may be classified into various groups according to their respective characters. For example, contact information, address information, user information, and location information which are written in texts may be grouped in alphabetical order. Also, the telephone number information may be grouped according to an area code or a country code. The applications may be grouped according to genres of the applications.

When at least one group is displayed on the screen of the terminal apparatus 200 and the first touch manipulation is performed, the controller 120 may control the terminal apparatus 200 to hop from a current group to a previous group or a next group, and display an item belonging to the hopped to group.

For example, when the terminal apparatus 200 displays contact information corresponding to a group C from among contact information grouped in alphabetical order, and simple touch and drag is performed or a direction button is pressed, the controller 120 may scroll through the other contact information of the group C in sequence according to the drag direction or button direction and may display the contact information. On the other hand, when the first touch manipulation is performed in this state, the controller 120 may directly hop to a group B, which is a previous group, or a group D which is a next group according to a direction or a shape of the first touch manipulation, and may display contact information of the corresponding group. Accordingly, the user can easily find contact information as he/she wants.

On the other hand, the controller 120 may change a mode according to user's selection. For example, when the user performs a second touch manipulation for handwriting recognition on the screen of the display 130, the controller 120 may change a mode to a handwriting recognition mode. The handwriting recognition mode refers to a mode in which a content handwritten on the screen of the display 130 by the user is recognized and an operation corresponding to the content is performed. In the handwriting recognition mode, when the user performs drawing on the screen of the display 130, the controller 120 recognizes the drawn content. For example, when the user draws the text 'C', the controller 120 controls the terminal apparatus 200 to hop to a group corresponding the drawn text C from among the plurality of groups provided by the terminal apparatus 200, and to display items belonging to the hopped to group.

In the present exemplary embodiment, features of the first touch manipulation or the second touch manipulation may be set as default or may be set by the user. Hereinafter, an example of each touch manipulation and a corresponding operation will be explained in detail.

Figure 4:
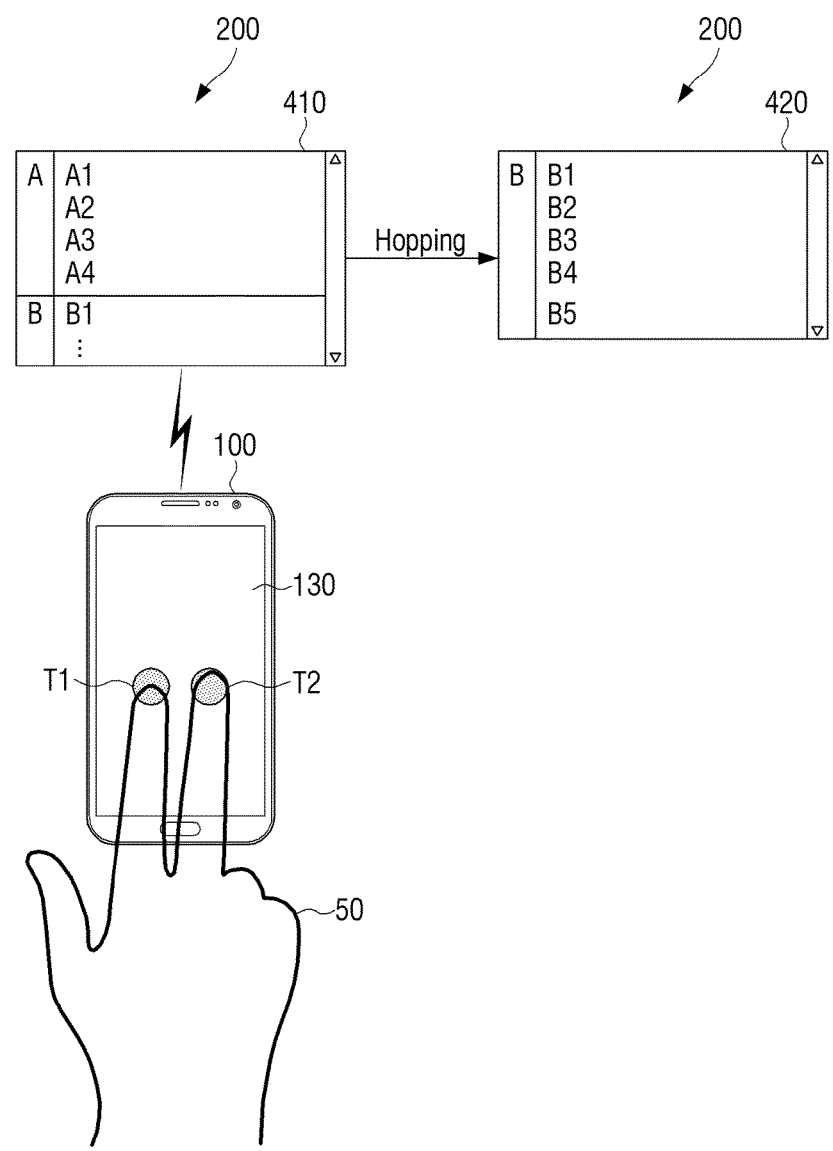
FIG. 4 is a view illustrating an example of an operation of the mobile device of FIG. 3.

FIG. 4 is a view illustrating an operation in the touch control mode. FIG. 4 illustrates a case in which an operation of touching the screen with user's plural fingers is set as a first touch manipulation. Also, in FIG. 4, the group A and some items of the group B are displayed on a single screen 410 of the terminal apparatus 200. For example, the group A and the group B may be distinguished from each other by first letters of already registered person names.

In this state, when the user touches a plurality of points T1 and T2 with his/her two fingers 50 on the screen of the display 130 of the mobile device 100, the controller 120 transmits a hopping command to the terminal apparatus 200. Accordingly, the terminal apparatus 200 performs group hopping and displays a screen 420 on which the group B, which is the next group of the group A currently displayed on the uppermost portion, is placed on the uppermost portion. When small numbers of items are included in a single group as shown in FIG. 4, the plurality of groups may be displayed on a single screen. In this case, the hopped to group may be displayed on the uppermost portion as shown in FIG. 4.

According to another exemplary embodiment, the hopping may be performed on a basis of a plurality of groups. That is, when the groups A and B are displayed on the single screen 410 and the first touch manipulation is performed, the controller 140 may directly hop to the group C which is the next group and has not been displayed. The hopping may not necessarily be performed on the basis of group and may be performed on a basis of items shown on the screen.

Figure 5:
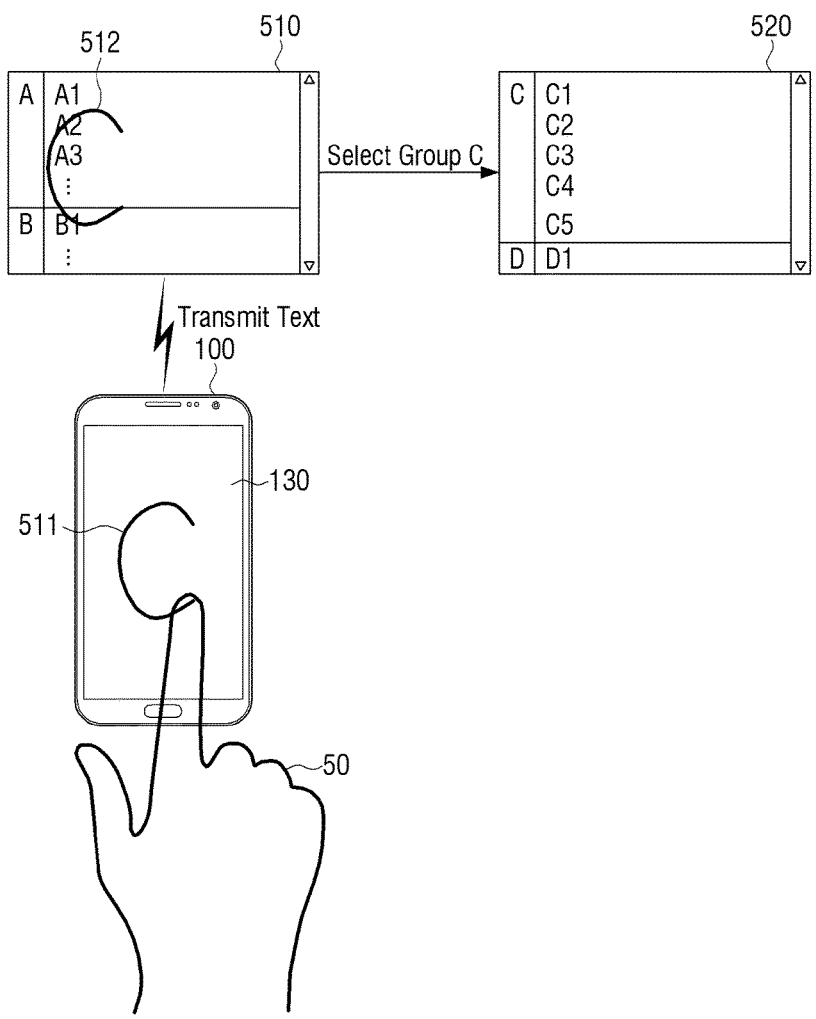
FIG. 5 is a view illustrating another example of the operation of the mobile device of FIG. 3.

FIG. 5 is a view illustrating an operation in the handwriting recognition mode. Referring to FIG. 5, the terminal apparatus 200 displays a screen 510 including some items of the group B and the group A. In this state, when a text "C" 511 is drawn on the display 130 of the mobile device 100, the controller 120 recognizes the drawn text and transmits a result of the recognizing to the terminal apparatus 200. Accordingly, the same text C 512 as the text drawn by the user is displayed on the screen 510 of the terminal apparatus 200.

After that, the terminal apparatus 200 hops to a group corresponding to the text C 512 and displays a screen 520 including items belonging to the hopped to group C. In FIG. 5, the group C and the group D are displayed on one screen 520.

The mobile device 100 may represent a point drawn by the user as a graphic user interface (GUI).

Figure 6:
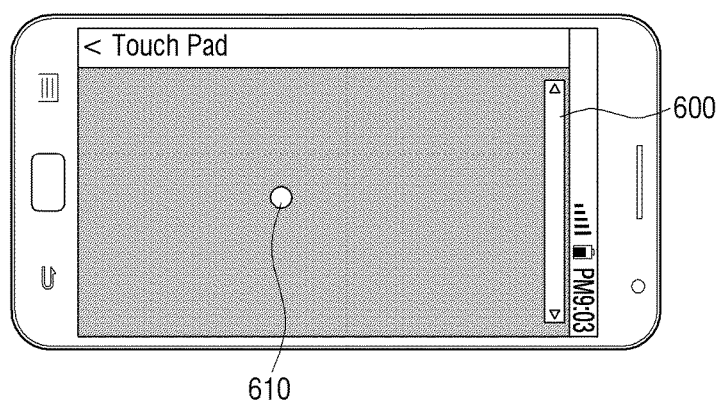
FIGS. 6 and 7 are views illustrating an example of a screen of the mobile device according to one or more exemplary embodiments.

FIG. 6 is a view illustrating an example of a screen configuration displayed on the mobile device 100. Referring to FIG. 6, when the mobile device 100 is connected with the terminal apparatus 200 for communication through the communicator 110, the controller 120 displays a screen 600 corresponding to the touch control mode on the display 130. A message indicating a touch pad and an area where the user is able to touch may be comprised to the screen 600. When the user performs a touch manipulation on the screen 600, the controller 120 displays a graphic object 610 in a point touched by the user.

Figure 7:
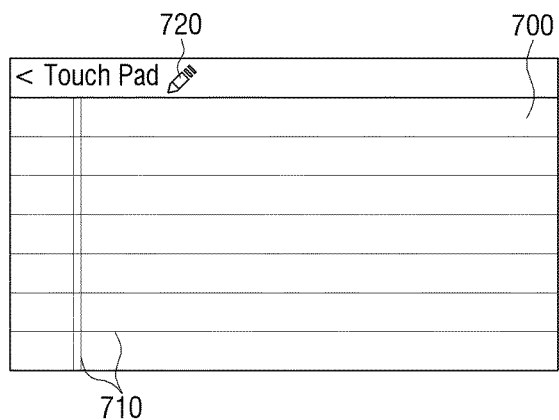

FIG. 7 is a view illustrating an example of a screen configuration when the mobile device 100 is operated in the handwriting recognition mode. Referring to FIG. 7, when the touch control mode is changed to the handwriting recognition mode, the controller 120 displays a screen 700 corresponding to the handwriting recognition mode on the display 130. Affordance GUIs 710 and 720 to guide the user to perform user drawing may be comprised to the screen 700. In FIG. 7, a line type of affordance GUI 710 and a writing tool type of affordance GUI 720 are displayed to make the user feel as if the display 130 is a note or a memo pad. Although not shown in FIG. 7, a message indicating that handwriting is possible may be displayed on the display 130 in the form of a pop-up window or a watermark of the screen 700. Although affordance GUIs 710 and 720 are shown, GUIs in the handwriting recognition mode are not limited to affordance GUIs.

As described above, the controller 130 may be operated in various modes such as the touch control mode and the handwriting recognition mode. The controller 130 may change the mode by various methods.

Figure 8:
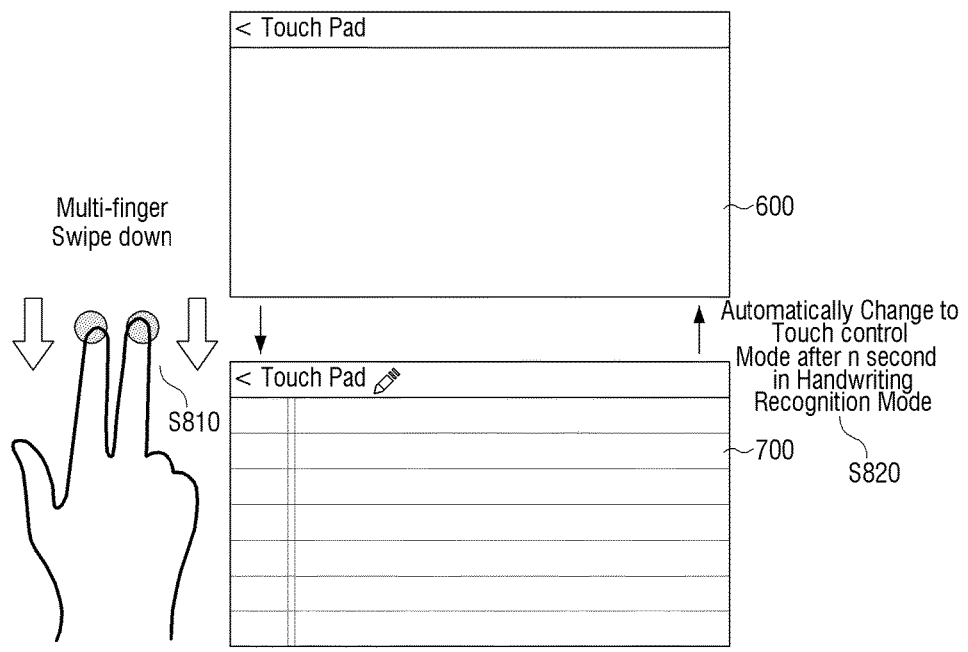
FIG. 8 is a view illustrating a screen of the mobile device in a mode of operation changing process according to one or more exemplary embodiments.

FIG. 8 is a view illustrating a process of changing a mode of operation according to one or more exemplary embodiments. Referring to FIG. 8, when a touch control mode screen 600 is displayed and the user performs a pre-defined second touch manipulation (S810), the controller 120 changes a mode to a handwriting recognition mode and displays a handwriting recognition mode screen 700. Although the second touch manipulation is touching two points on a screen with user's fingers and then moving down user's fingers while still touching in FIG. 8, this should not be considered as limiting and the second touch manipulation may be defined in various forms.

When user drawing is not input for a predetermined time after the mode is changed to the handwriting recognition mode (S820), the controller 120 may return to the touch control mode. Accordingly, the touch control mode screen 600 is displayed again. Although the controller 120 automatically returns to the touch control mode as the time elapses in FIG. 8 on the other embodiment, the controller 120 may return to the touch control mode when the first touch manipulation is performed on the handwriting recognition mode screen 700.

As described above, the user may freely change the screen displayed on the terminal apparatus 200 using the mobile device 100. When the terminal apparatus 200 is attached to a means of transportation such as a vehicle and the user is driving the vehicle, and when the user manipulates the terminal apparatus 200 while viewing the screen of the terminal apparatus 200, the user may not avoid danger of accident. In particular, when the user searches for a destination to set a navigation function, address information in the form of a list is displayed. In this case, when the user searches for the destination by scrolling the lists of addresses on the screen one by one, it takes much time and effort to search for the destination, and accordingly, the user may be exposed to danger of accident. On the other hand, according to the above-described exemplary embodiments, the user may easily hop to a desired group by touching or inputting writing using the mobile device 100 that the user is accustomed to manipulating, without viewing the screen of the terminal apparatus 200. Accordingly, the user can search for the destination easily and rapidly.

In the above-described exemplary embodiments, hopping is performed on the groups by pre-defined touching or writing. However, the user may perform various control operations using the display 130 of the mobile device 100 connected with the terminal apparatus 200 like a touch pad. That is, when hopping is completed and a specific group is displayed, a more detailed manipulation may be required in order to select a desired item of the corresponding group and execute a function.

Figure 9:
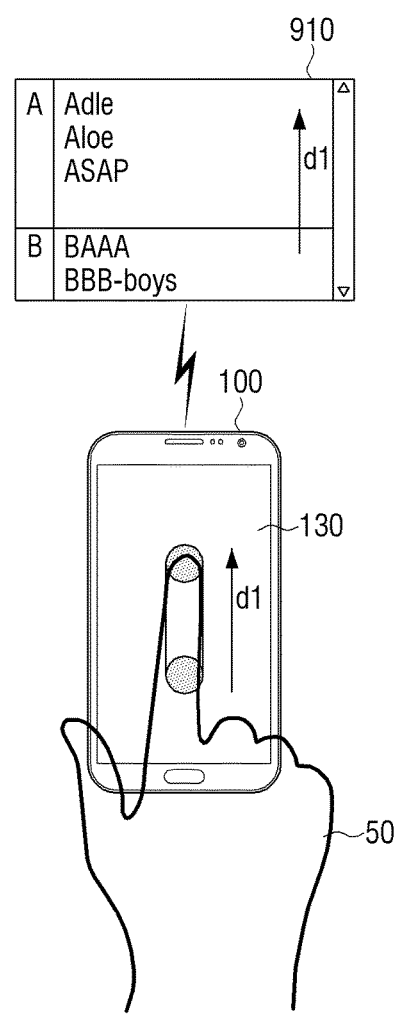
FIG. 9 is a view illustrating an example of a method for controlling a terminal apparatus using a mobile device according to one or more exemplary embodiments.

FIG. 9 is a view illustrating another method for controlling the operation of the terminal apparatus using the mobile device. Referring to FIG. 9, the user may touch one point on the screen 130 of the mobile device 100 with his/her one finger and then may drag or flick. The controller 120 scrolls on a screen 910 of the terminal apparatus 200 according to a direction and a distance of the user's dragging or flicking. When the user drags in a direction of d1 as shown in FIG. 9, the controller 120 scrolls on the screen 910 of the terminal apparatus 200 in the direction of d1.

When the user finds a desired group by hopping over the groups as described above, the user scrolls to find a desired item of the corresponding group. Accordingly, when the user finds the desired item, the user may select the item by double touching the screen of the mobile device 100 or may directly select the item on the screen of the terminal apparatus 200. When it is assumed that each item is destination information as described above, the controller 120 may set the item selected by the user as a destination and may directly execute the navigation function to reach the set destination.

Figure 10:
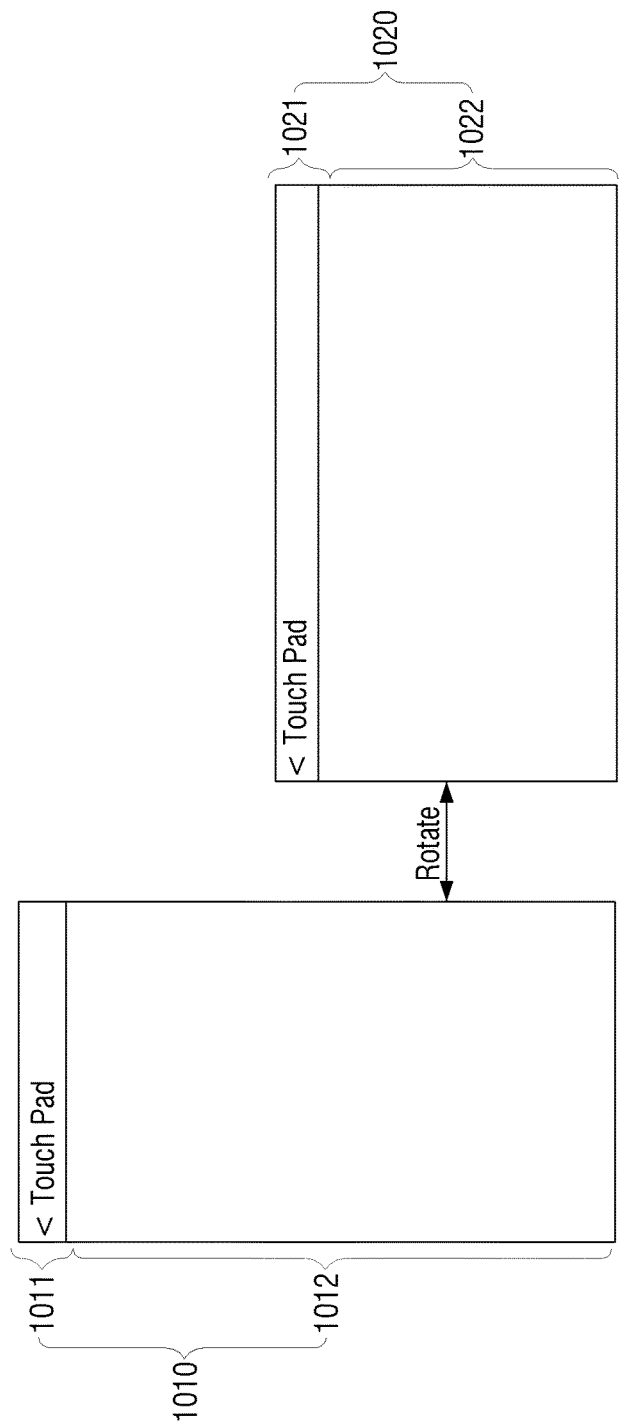
FIG. 10 is a view illustrating changing a screen of a mobile device according to a motion according to one or more exemplary embodiments.

The user may rotate the mobile device 100 in a desired direction and may freely use the mobile device 100. FIG. 10 illustrates the rotated mobile device.

Referring to FIG. 10, when the mobile device 100 is placed in the portrait orientation, an indicator 1011 indicating a touch pad is displayed on an upper portion of a screen 1010 and a touch area 1012 is displayed on a lower portion of the screen 1010.

In this state, when the mobile device 100 is rotated and placed in the landscape orientation, an indicator 1021 is displayed on an upper portion of a screen 1020 in the rotated state and a touch area 1022 is displayed on a lower portion of the screen 1020. That is, the shape of the touch area varies according to rotation.

According to an exemplary embodiment, the mobile device 100 may further include a motion sensor such as a geomagnetic sensor, a gyro sensor, an acceleration sensor, etc. The controller 120 may change a display direction of the screen according to a result of sensing by the motion sensor. Also, when the user performs a touch manipulation on the changed screen, the controller 120 may determine a direction of the touch manipulation with reference to the changed screen.

Figure 11:
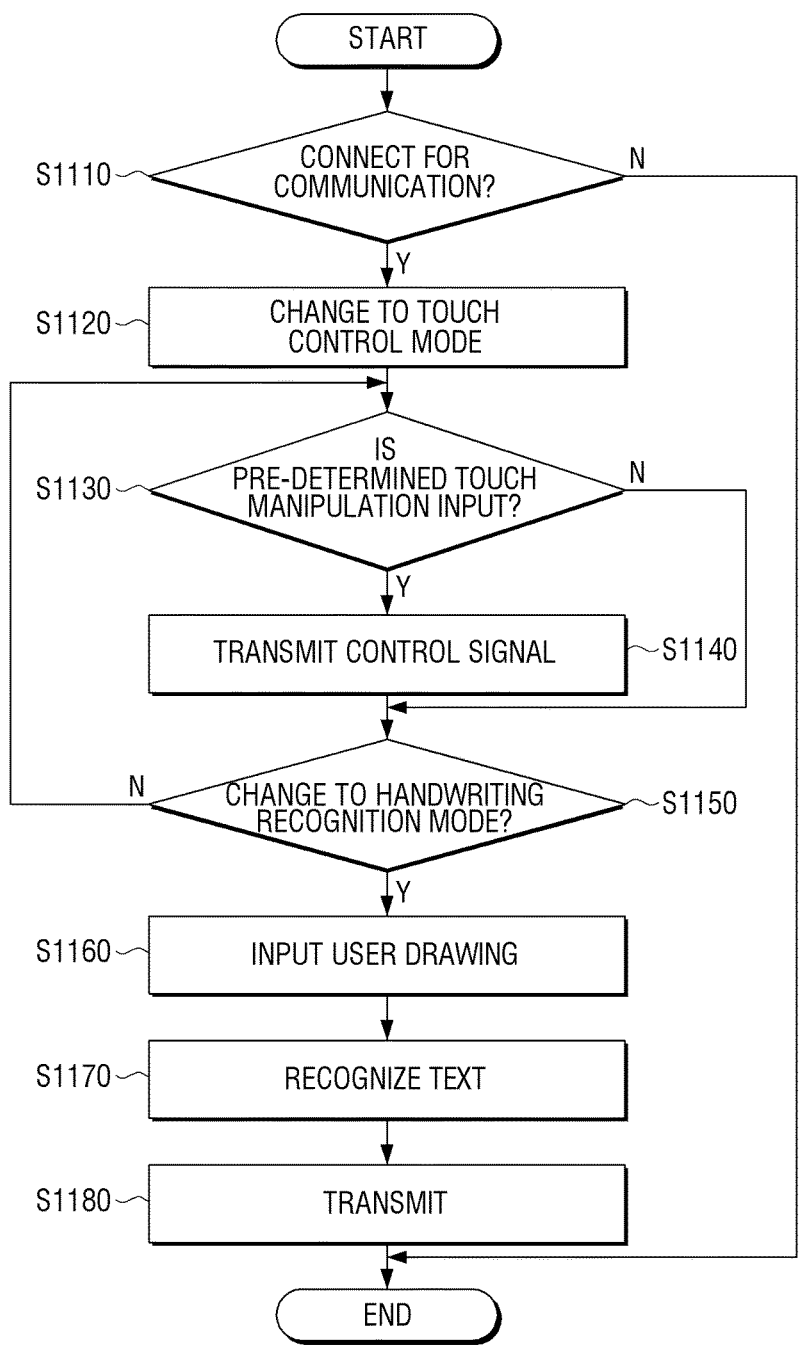
FIG. 11 is a flowchart illustrating a method for controlling a terminal apparatus according to an exemplary embodiment.

FIG. 11 is a flowchart illustrating a control method of a mobile device according to an exemplary embodiment. Referring to FIG. 11, when the mobile device 100 is connected with the terminal apparatus 200 for communication (S1110), a mode is automatically changed to a touch control mode (S1120). In this state, when the user inputs a predefined touch manipulation (S1130), the mobile device 100 may transmit a control signal corresponding to the touch manipulation to the terminal apparatus 200 and may control the operation of the terminal apparatus 200 (S1140). The control signal may include various signals, such as a menu selection signal, a screen change signal, and a scroll signal, as well as a hopping signal for hopping from a current group displayed on the terminal apparatus 200 to a previous or next group.

Accordingly, the user can use the mobile device 100 like a remote controlling means for controlling the terminal apparatus 200 and thus can easily control the terminal apparatus 200.

When a condition for changing the mode to a handwriting recognition mode is satisfied (S1150), the mobile device 100 changes the mode. In this state, the mobile device 100 receives input of user drawing (S1160). When the user drawing is input, the mobile device 100 recognizes the drawn text (S1170) and transmits the recognized text to the terminal apparatus 200 (S1180). Accordingly, the terminal apparatus 200 may provide various services using the corresponding text.

Figure 12:
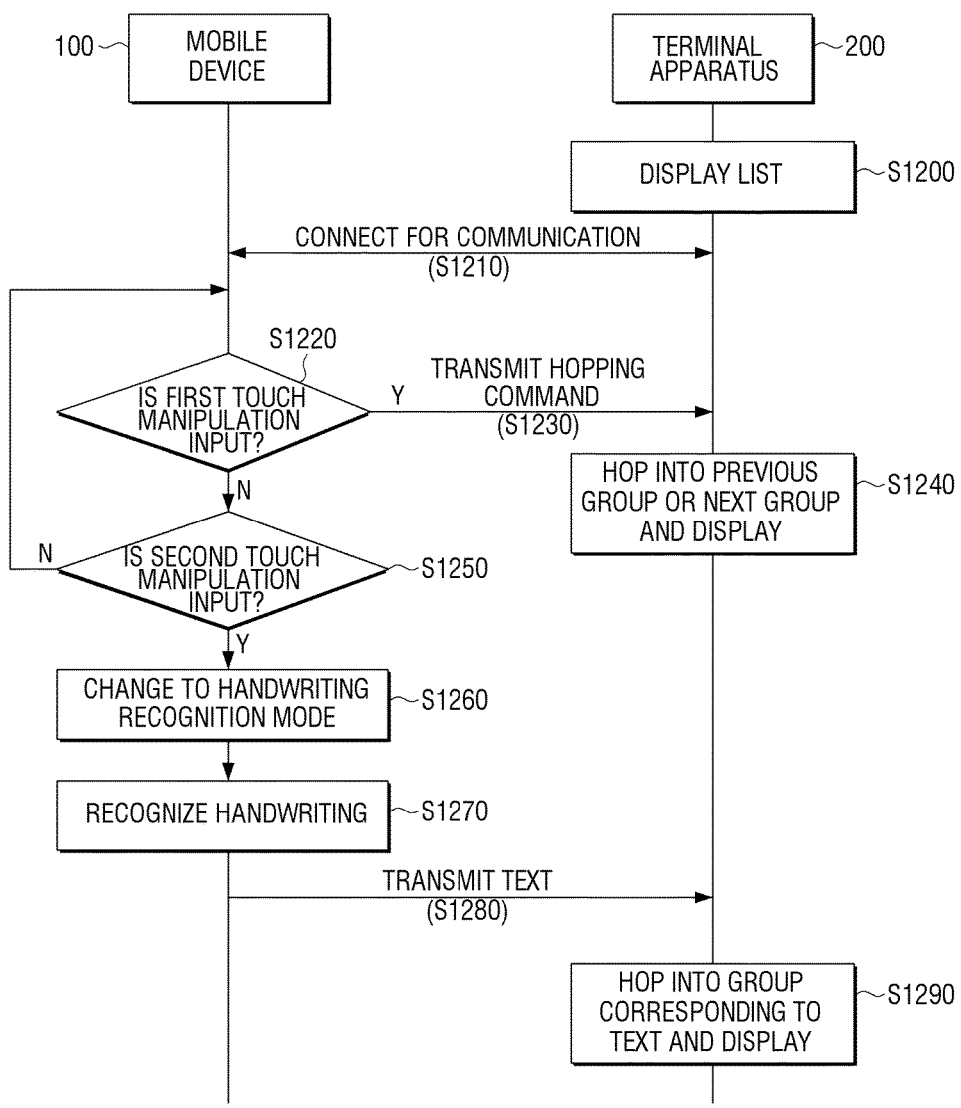
FIG. 12 is a timing chart illustrating operations of a mobile device and a terminal apparatus according to one or more exemplary embodiments.

FIG. 12 is a timing chart illustrating operations of a mobile device 100 and a terminal apparatus 200. Referring to FIG. 12, when the terminal apparatus 200 displays a list of a plurality of items (S1200), the mobile device 100 and the terminal apparatus 200 may be connected with each other for communication (S1210). Although the list of items is displayed before the mobile device 100 and the terminal apparatus 200 are connected with each other for communication in FIG. 12, the list may be displayed after the communication is established.

When the communication is established as described above and a first touch manipulation is input to the mobile device 100 (S1220), the mobile device 100 transmits a hopping command (S1230).

The terminal apparatus 200 hops to a previous group or a next group according to the hopping command and displays items belonging to the hopped to group (S1240).

On the other hand, when the user inputs a second touch manipulation to the mobile device 100 (S1250), a current mode is changed to a handwriting recognition mode (S1260). When the user performs drawing in the handwriting recognition mode, the mobile device 100 recognizes the handwritten content (S1270) and transmits the recognized text (S1280). The terminal apparatus 200 may directly hop to a group corresponding to the text and display items belonging to that group (S1290).

In the above-described exemplary embodiments, the mobile device 100 recognizes a user manipulation and transmits an appropriate signal corresponding to the manipulation to the terminal apparatus 200. However, this should not be considered as limiting. That is, according to still another exemplary embodiment, the mobile device 100 may serve as a simple inputting means for the terminal apparatus 200. In this case, when the mobile device 100 is connected with the terminal apparatus 200 for communication and the user touches the screen of the display 130 of the mobile device 100, the controller 120 of the mobile device 100 may transmit coordinate values of the touch point to the terminal apparatus 200 as they are. The terminal apparatus 200 may recognize a user manipulation content using the transmitted coordinate values and may perform a corresponding operation such as hopping over groups, scrolling, selecting an item, and executing a function.

On the other hand, in the above-described exemplary embodiments, the terminal apparatus 200 is controlled by using the display 130 of the mobile device 100 like a touch pad. However, the terminal apparatus 200 may be controlled by using a separate control apparatus other than the mobile device 100. Such a control apparatus may be implemented in various forms. Hereinafter, a configuration and an operation of a control apparatus for controlling the terminal apparatus 200 according to exemplary embodiments will be explained in detail.

Figure 13:
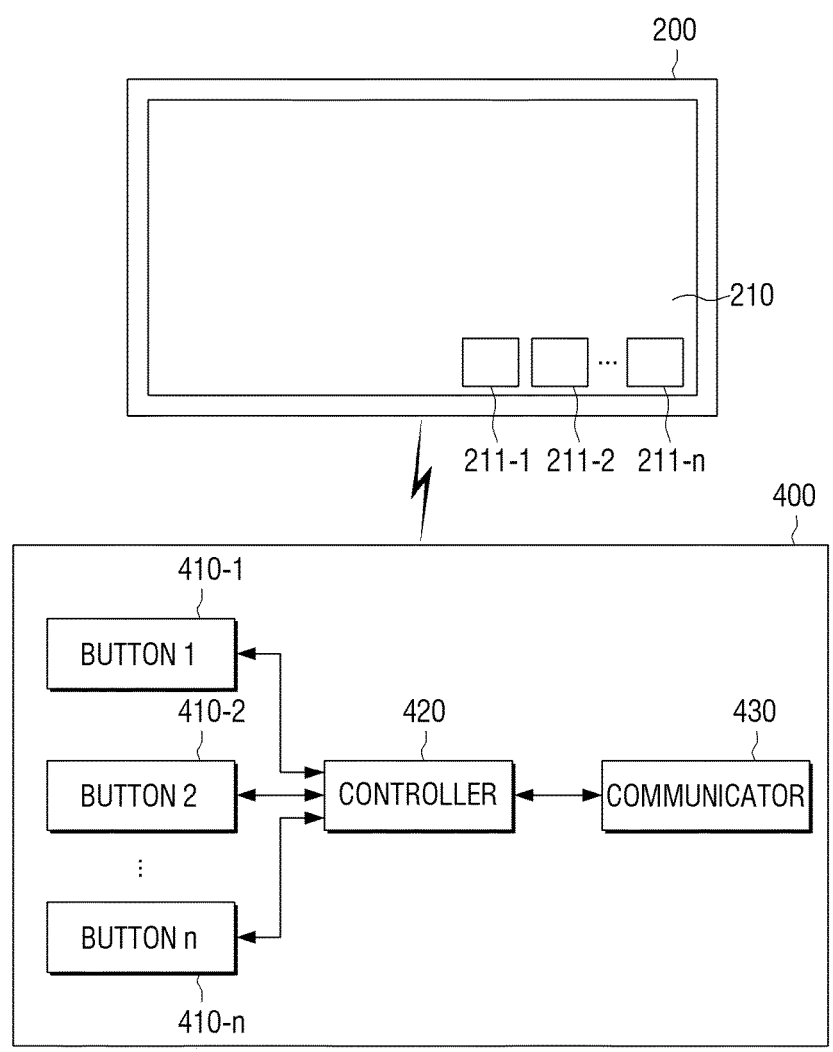
FIG. 13 is a block diagram illustrating a configuration of a control apparatus according to another exemplary embodiment.

FIG. 13 is a block diagram illustrating a configuration of a control apparatus according to an exemplary embodiment. Referring to FIG. 13, a control apparatus 400 includes a plurality of buttons 410-1 to 410-n, a controller 420, and a communicator 430.

The plurality of buttons 410-1 to 410-n may be aligned sequentially along at least one line. Each of the buttons 410-1 to 410-*n* may be implemented in various forms. As non-limiting examples, each of the buttons 410-1 to 410-*n* may be implemented as a push button, a touch button, a wheel button, a jog and shuttle button, etc.

The communicator 430 is an element for communicating with an external apparatus. Specifically, the communicator 430 may communicate with the terminal apparatus 200 mounted on a means of transportation such as a vehicle using various wireless communication methods such as Wi-Fi, Bluetooth, Zigbee, 3G, 3GPP, LTE, NFC, etc. or wire communication methods such as a USB, a serial interface, etc.

The terminal apparatus 200 includes a display and displays various screens 210. A plurality of menus 211-1 to 211-*n* aligned to correspond to the plurality of buttons 410-1 to 410-*n* arranged in the control apparatus 400 may be displayed on one side of the screen 210.

The controller 420 may transmit a control signal corresponding to a button that is selected by the user from among the plurality of buttons 410-1 to 410-*n* to the terminal apparatus 200 through the communicator 430, and may control the operation of the terminal apparatus 200. Specifically, when one button is selected, the controller 420 may transmit a control signal to execute a menu that is placed on the same location as that of the selected button or has the same shape as that of the selected button from among the menus 211-1 to 211-*n* displayed on the screen 210 of the terminal apparatus 200.

The terminal apparatus 200 does not display only a single screen and may selectively display screens of a plurality of different pages. For example, when a navigation menu is selected on a main page, a navigation screen page may be displayed. Also, when a multimedia playback menu is selected, a multimedia playback page may be displayed. As described above, the screen may be divided into a plurality of different pages and each page may display different menus. For example, the main page may display a navigation menu, a multimedia playback menu, a setting menu, etc, and the navigation screen page may display a destination setting menu, a current location display menu, an option menu, etc. The multimedia playback page may display a content list menu, a content search menu, a playback menu, etc.

When one page is changed to another page, the terminal apparatus 200 may align menus to be used on the changed screen in the same form as that of the buttons 410-1 to 410-*n* and may display the menus. The user may easily select the menus provided on each page using the same number of buttons 410-1 to 410-*n*.

Figure 14:
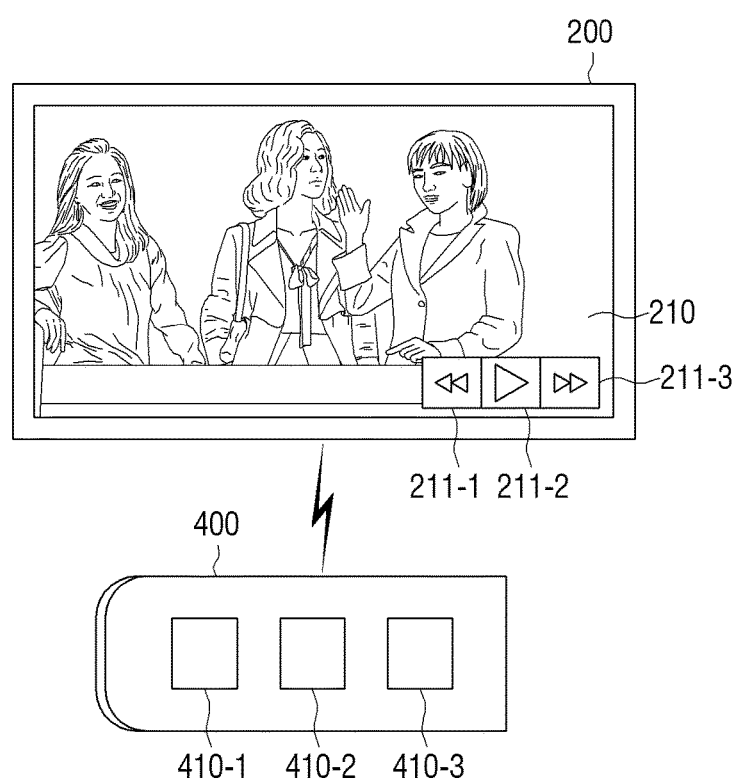
FIG. 14 is a view illustrating a process of controlling a terminal apparatus using the control apparatus of FIG. 13.

FIG. 14 is a view illustrating an exterior configuration of the control apparatus 400 and a corresponding control operation by way of an example. Referring to FIG. 14, the control apparatus 400 may include three buttons 410-1, 410-2, and 410-3, and the terminal apparatus 200 may display a screen 210 including a plurality of menus 211-1, 211-2, and 211-3 which are aligned in the same pattern as that of the buttons 410-1, 410-2, and 410-3. In FIG. 14, a content playback screen is displayed. Although three buttons 410-1 to 410-3 are shown, exemplary embodiments may utilize a different number of buttons.

In this state, when the user selects the left button 410-1, the controller 420 transmits a control signal to execute the left menu 211-1 to the terminal apparatus 200. In FIG. 14, a control signal for executing rewinding is transmitted.

On the other hand, when the user selects the middle button 410-2, the controller 420 recognizes that the middle menu 211-2 is selected and transmits a control signal corresponding to the middle menu 211-2 to the terminal apparatus 200. On the other hand, when the user selects the right button 410-3, the controller 420 recognizes that the right menu 211-3 is selected and transmits a control signal corresponding to the right menu 211-3 to the terminal apparatus 200. As described above, the control apparatus 400 and the terminal apparatus 200 may be interlocked with each other.

Figure 15:
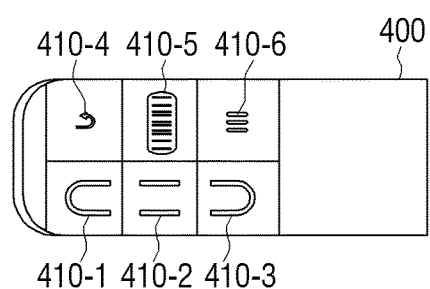
FIG. 15 is a view illustrating an example of an exterior configuration of a control apparatus according to one or more exemplary embodiments.

FIG. 15 is a view illustrating another example of the exterior configuration of the control apparatus 400. Referring to FIG. 15, 6 buttons 410-1 to 410-6 in total are aligned in two lines. From among those buttons, the 3 lower buttons 410-1, 410-2, and 410-3 are buttons that are interlocked with menus displayed on the screen of the terminal apparatus 200 and have their functions dynamically changed, and the 3 upper buttons 410-4, 410-5, and 410-6 are buttons for performing fixed functions.

The 3 lower buttons 410-1, 410-2, and 410-3 may be mapped onto content playback functions. For example, the first button 410-1, the second button 410-2, and the third button 410-3 may be mapped onto a previous content playback function, a playback/pause function, and a next content playback function, respectively. Accordingly, when menus corresponding to the buttons are not displayed and the first, second, or third button is selected, the controller 420 may play back a music content or multimedia content corresponding to the selected button.

On the other hand, when the terminal apparatus 200 displays a screen including a plurality of menus, the controller 420 changes the functions mapped onto the 3 lower buttons 410-1, 410-2, and 410-3 to functions corresponding to the menus displayed on the screen. For example, when a navigation screen page is displayed and a navigation menu, a multimedia playback menu, and a setting menu are displayed on the page in sequence, the controller 420 maps the first to third buttons 410-1, 410-2, 410-3 onto the navigation menu, the multimedia playback menu, and the setting menu, respectively.

Separately from the first to third buttons 410-1 to 410-3, the fourth to sixth buttons 410-4 to 410-6 may be mapped onto fixed functions. For example, the fourth button 410-4, the fifth button 410-5, and the sixth button 410-6 may be mapped onto a function of moving to a previous screen, a function of scrolling or selecting, and a function of displaying/closing a menu, respectively.

When the fifth button 410-5 is implemented in a wheel button form as shown in FIG. 15, and when the wheel button moves up and down, the controller 420 transmits a control signal to scroll up and down on the screen according to the wheel motion to the terminal apparatus 200. Also, when the wheel button is clicked, the controller 420 may transmit a control signal to select an item where a current cursor is placed on the screen of the terminal apparatus 200 to the terminal apparatus 200.

Figure 16:
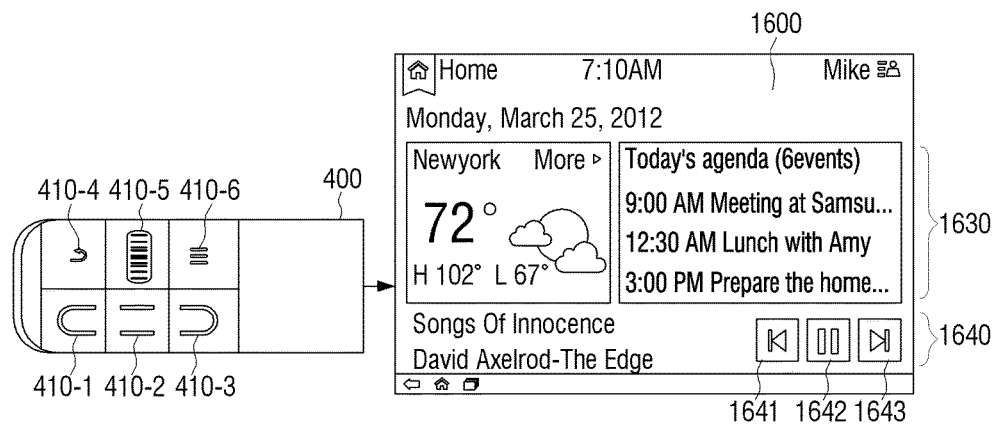
FIGS. 16 to 18 are views illustrating a process of interlocking a control apparatus and a terminal apparatus with each other according to one or more exemplary embodiments.
Figure 17:
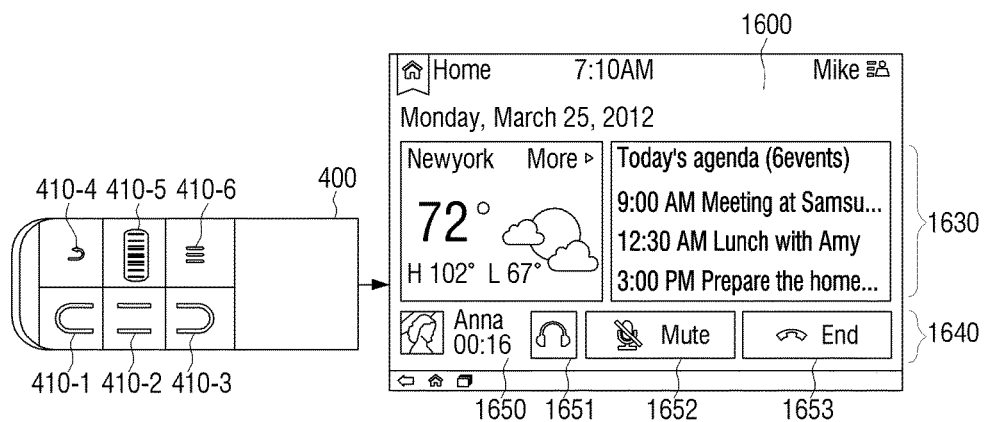
Figure 18:
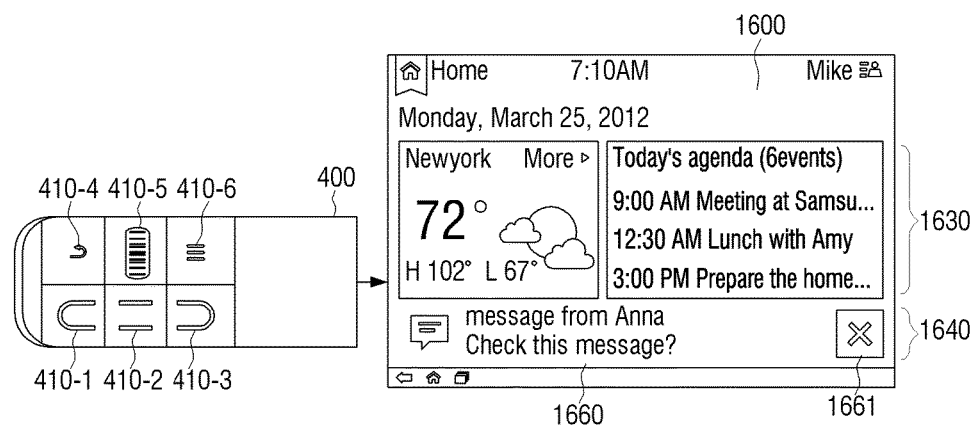

As described above, when the screen of the terminal apparatus 200 is changed, the functions mapped onto the first to third buttons 410-1 to 410-3 are changed according to types of menus displayed on the changed screen. FIGS. 16 to 18 are views illustrating examples of changed menus.

FIG. 16 illustrates a configuration example of a main screen 1600 of the terminal apparatus 200. The main screen 1600 may display a variety of information such as date information 1610, weather information 1620, schedule information 1630, and content display area 1640 for displaying information on a content to be played back. The content display area 1640 may comprise menus 1641, 1642, and 1643 to adjust playback of the content. The controller

420 may map the first to third buttons 410-1 to 410-3 with the menus 1641, 1642, and 1643.

In this state, when a phone call is received, the terminal apparatus 200 may change the content display area 1640 to instead display phone call reception information 1650 as shown in FIG. 17.

FIG. 17 illustrates a screen configuration example of the terminal apparatus when the phone call is received. Referring to FIG. 17, the phone call reception information 1650 may comprise a sender's name and a time, and may comprise various menus 1651, 1652, and 1653 related to the phone call reception. Specifically, a menu 1651 to talk on the phone using a headset, a mute menu 1652, and a call rejection menu 1653 may be displayed. The controller 410 may map the first to third buttons 410-1 to 410-3 with the menus 1651, 1652, and 1653, respectively.

FIG. 18 illustrates a screen configuration example of the terminal apparatus when a message is received. Referring to FIG. 18, the terminal apparatus 200 may display a notice message informing that a message has been received on a lower portion of the main screen 1600. The notice message may include a check menu 1660 to check the message and a refusal menu 1661 to refuse to check the message. In this case, the controller 420 may commonly map the first button 410-1 and the second button 410-2 with the check menu 1660, and may map the third button 410-3 with the refusal menu 1661.

As described above, the number of menus displayed on the screen may not necessarily be the same as the number of buttons and may be smaller than the number of buttons. When the number of menus is smaller than the number of buttons, a plurality of buttons may be mapped to a single menu and the menu may be executed when one of the buttons is selected. On the other hand, when the number of menus is greater than the number of buttons, and when one button is selected, a plurality of menus may be executed simultaneously.

On the other hand, the user may input a swipe manipulation to select the first to third buttons 410-1 to 410-3 in sequence in one direction.

Figure 19:
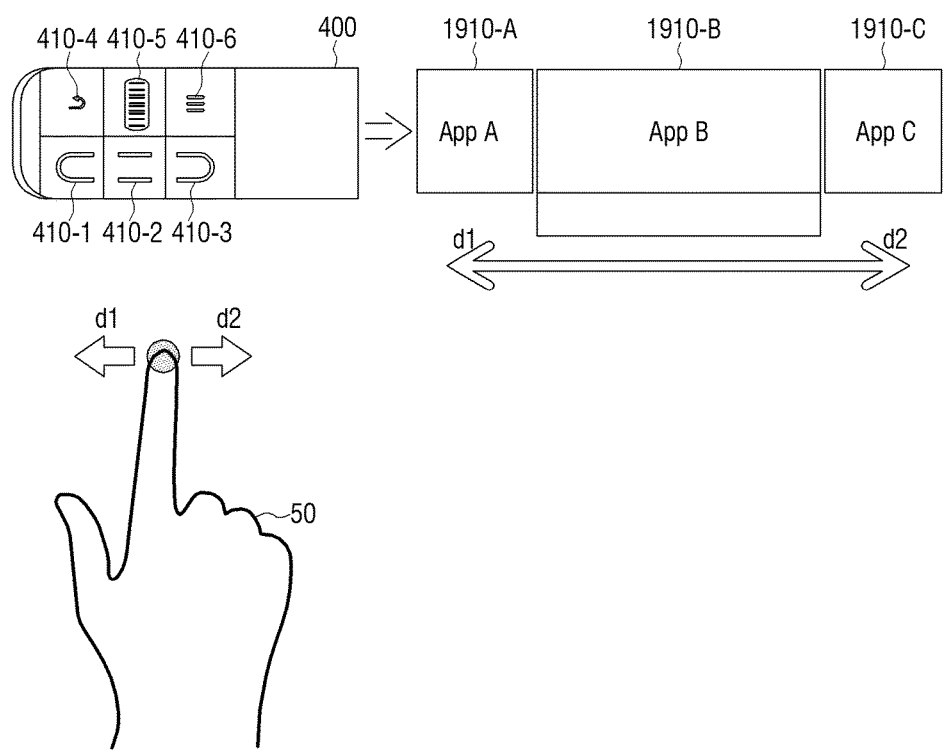
FIG. 19 is a view illustrating a method for changing a screen using a control apparatus according to one or more exemplary embodiments.

FIG. 19 is a view illustrating a swipe manipulation and a corresponding operation.

When a swipe manipulation is sensed, the controller 420 transmits a control signal to change a screen to another screen according to a direction of the swipe manipulation to the terminal apparatus 200. The swipe manipulation recited herein refers to a manipulation of selecting the first to third buttons in sequence in a direction of d2 from the first button to the third button or in a direction of d1 from the third button to the first button as if the user sweeps the buttons with his/her finger.

When the swipe manipulation is performed in the direction of d1 in FIG. 19, the controller 420 transmits a control signal to change a current screen 1910-B to a next screen 1910-C to the terminal apparatus 200. On the other hand, when the swipe manipulation is performed in the direction of d2, the controller 420 may transmit a control signal to change the current screen 1910-B to a previous screen 1910-A to the terminal apparatus 200.

Such a screen changing operation may be performed at any time when there is no notice message on a lower end of the screen.

As described above, various buttons are provided on the control apparatus 400 and the user may perform various operations such as moving between applications, changing a screen, selecting and moving a list, controlling music, controlling a notice, controlling a function, selecting a menu, etc. without touching the terminal apparatus 200 with his/her hand. Also, since the buttons and the menus may be configured to correspond to each other consistently, the user may control the terminal apparatus 200 using the control apparatus 400 without viewing the screen of the terminal apparatus 200.

The control apparatus 400 described above may be placed on a certain location of a vehicle that the user can easily reach. For example, the control apparatus 400 may be fixed on a handle of a vehicle.

Figure 20:
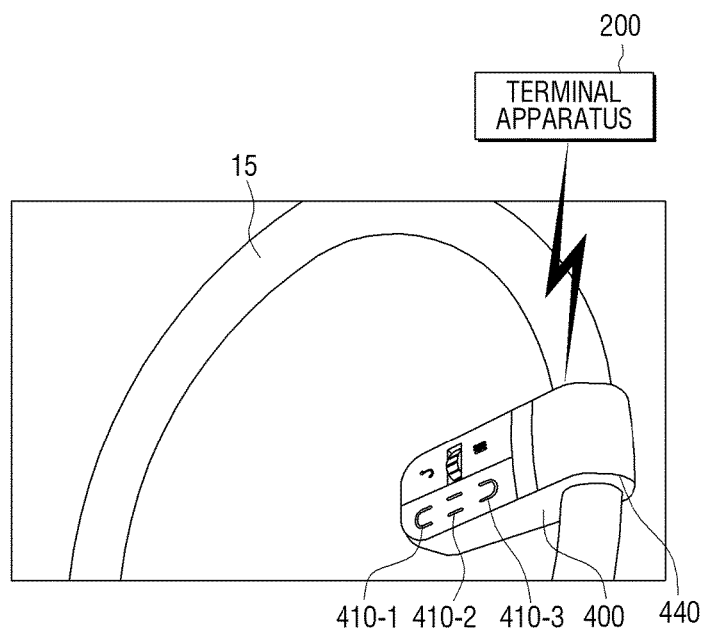
FIG. 20 is a view illustrating an exterior of a control apparatus which is attachable to a vehicle handle according to one or more exemplary embodiments.

FIG. 20 illustrates a configuration of the control apparatus 400 which is fixed to a steering wheel of a vehicle. Referring to FIG. 20, the control apparatus 400 may further include a fixer 440. The fixer 440 serves to fix the control apparatus 400 to the handle 15 of the vehicle. The fixer 440 may be implemented in a C-shaped recess to fit on the handle 15 of the vehicle. Alternatively, the fixer 440 may include a securing means (not shown) to fit on the handle 15 of the vehicle through an open part and tighten the open part.

Figure 21:
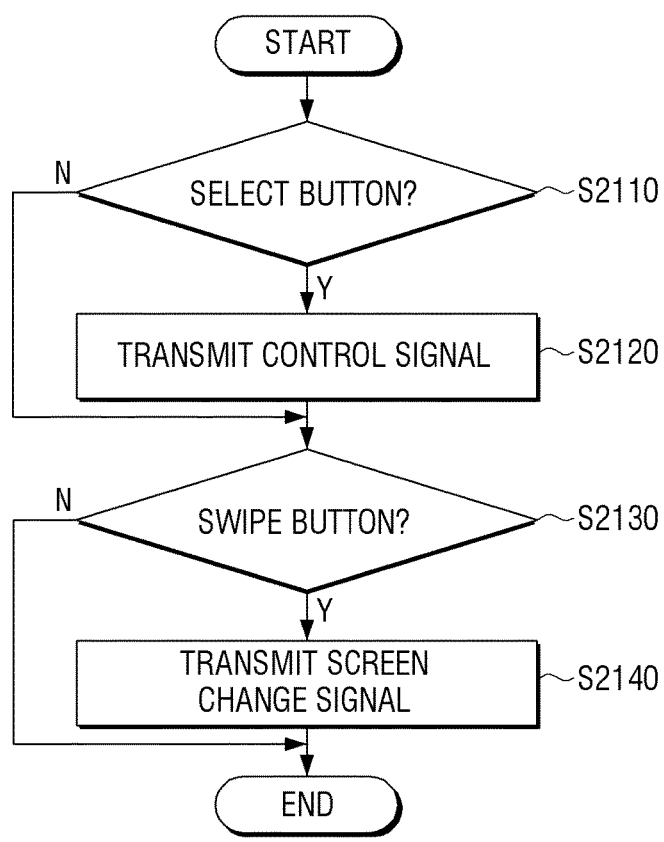
FIG. 21 is a flowchart illustrating a method for controlling a terminal apparatus using a control apparatus according to another exemplary embodiment.

FIG. 21 is a flowchart illustrating a method for controlling a terminal apparatus using a control apparatus according to an exemplary embodiment. Referring to FIG. 21, when the user selects one of the buttons displayed on the control apparatus 400 (S2110), the control apparatus 400 transmits a control signal to execute a function mapping the button to the terminal apparatus 200 (S2120). When a screen displayed on the terminal apparatus 200 is changed and a new menu is displayed on the changed screen, the controller apparatus 400 maps a function corresponding to the new menu with each button. Accordingly, when the button is selected again, the control apparatus 400 transmits a control signal to execute the mapped function to the terminal apparatus 200.

On the other hand, when the user performs a swipe manipulation on the plurality of buttons (S2130), the control apparatus 400 transmits a screen change signal to change a current screen to a previous screen or a next screen according to a swipe direction to the terminal apparatus 200 (S2140). Accordingly, the user can easily control the function of the terminal apparatus 200 without stretching user's hand to reach the screen of the terminal apparatus 200 or a body button of the terminal apparatus 200.

According to still another exemplary embodiment, backlight may be provided to the button so that the user can easily recognize a mapped relationship between the button and the function.

Figure 22:
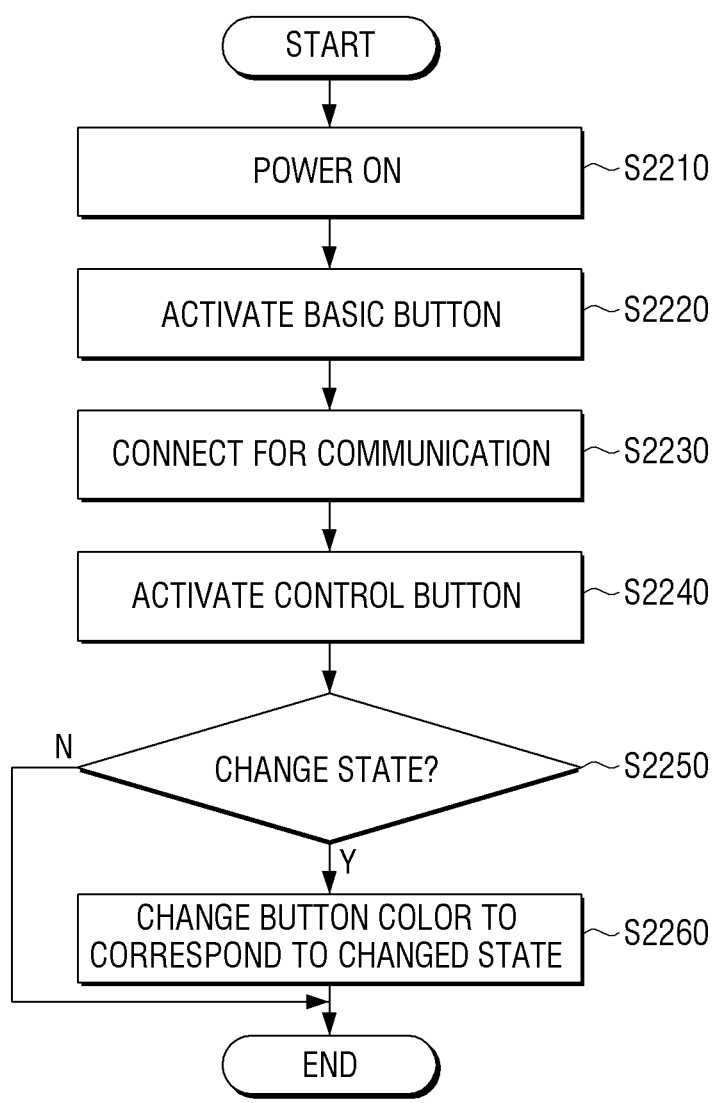
FIG. 22 is a flowchart illustrating an operation of a control apparatus according to another exemplary embodiment.

FIG. 22 is a flowchart illustrating a control method of a control apparatus according to this exemplary embodiment. Referring to FIG. 22, when the control apparatus 400 is powered on (S2210), a basic button may be activated (S2220). The basic button is a button that is mapped to a fixed function. For example, in the case of the control apparatus 400 shown in FIG. 15, the fourth to sixth buttons 410-4 to 410-6 are basic buttons.

The controller 420 may turn on a backlight unit which is disposed under the activated basic button and may provide color light to each basic button. That is, the control apparatus 400 may further include a plurality of backlight units which are disposed under the plurality of buttons 410-1 to 410-n and provide color light to each button. The backlight unit may be implemented by using a light emitting diode (LED).

In this state, when communication is established between the terminal apparatus 200 and the communicator 430 (S2230), the controller 420 activates a control button (S2240). The control button refers to a button that has its function dynamically changed from among the plurality of buttons. For example, in the case of the control apparatus 400 of FIG. 15, the first to third buttons 410-1 to 410-3 are control buttons. The controller 420 may turn on a backlight unit which is disposed under the activated control button and may provide color light to each control button.

When each button emits light, the user may recognize that the corresponding button is activated.

The controller 420 may change color of the color light provided to each button, individually, considering various situations such as a state of the control apparatus 400, a state of the terminal apparatus 200, types of menus displayed on the terminal apparatus 200, etc.

Accordingly, the controller 420 may monitor whether the state is changed or not periodically (S2250). When the state is changed as a result of the monitoring, the controller 420 changes color of the button to correspond to the changed state (S2260).

Figure 23:
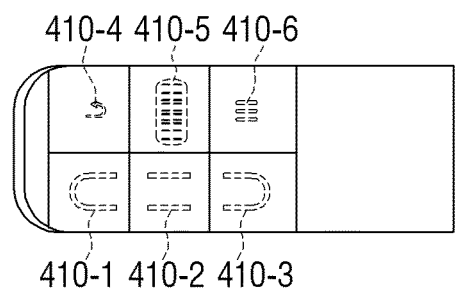
FIGS. 23 to 26 are views illustrating a process of changing a button color of a control apparatus according to one or more exemplary embodiments.
Figure 24:
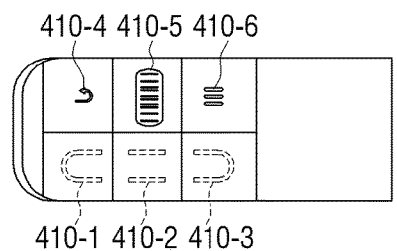
Figure 25:
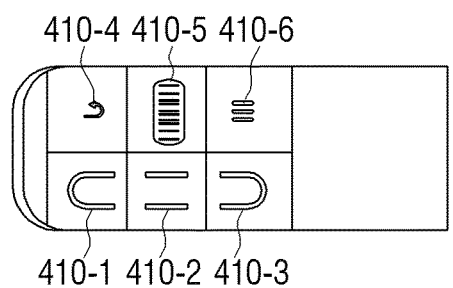

FIGS. 23 to 25 are views illustrating a lighting state of each button. FIG. 23 illustrates a power off state. Since each button is inactivated in the power off state, no light is provided to each button (in FIGS. 23, 410-4 to 410-6 are illustrated with dotted lines).

FIG. 24 illustrates a case in which communication is not established in a power on state. In this case, light is provided only to the basic buttons 410-4 to 410-6 from among the buttons such that the basic buttons 410-4 to 410-6 are brightly displayed.

FIG. 25 illustrates a case in which communication is established in the power on state. In this case, the control buttons 410-1 to 410-3 as well as the basic buttons 410-4 to 410-6 are activated and are brightly displayed.

The light provided to the basic buttons 410-4 to 410-6 may have the same color and the same brightness, whereas the light provided to the control buttons 410-1 to 410-3 may have a variety of colors and a variety of brightness according to situations. For example, light of a variety of colors such as orange color of (R: 186, G: 69, B: 4), green color of (R: 0, G: 118, B: 91), blue color of (R: 14, G: 66, B: 145), and grey color of (R: 160, G: 160, and B: 160) may be provided to the buttons individually.

Such color may vary according to the importance of a menu displayed on the screen or the importance of a notice message. For example, when the first to third buttons 410-1 to 410-3 are mapped to the content playback function, the first to third buttons 410-1 to 410-3 may be displayed in blue color. In this state, when a phone call is received, the first to third buttons 410-1 to 410-4 may be displayed in green color, and, when a message is received, the first to third buttons 410-1 to 410-4 may be displayed in orange color. In this manner, the color may be changed.

Also, the color of each button may be changed according to a characteristic of a menu mapped to the button. For example, when the first to third buttons 410-1 to 410-3 are mapped to different menus 1651, 1652, and 1653 as shown in FIG. 17, the first to third buttons 410-1 to 410-3 may be displayed in different colors. On the other hand, when the first and second buttons 410-1 and 410-2 may be mapped to the same menu and the third button 410-3 may be mapped to a different menu as shown in FIG. 18, the first and second buttons 410-1 and 410-2 are displayed in the same color and only the third button 410-3 is displayed in different color. As shown in FIG. 18, the third button 410-3 mapped to the refusal menu may be displayed in grey color and may be lit.

Figure 26:
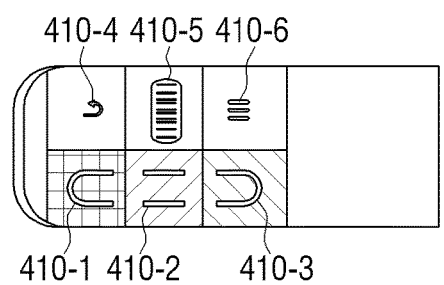

FIG. 26 illustrates a case in which the first to third buttons 410-1 to 410-3 are displayed in different colors. The controller 420 inputs an appropriate driving pulse to R, G, and B LEDs disposed under the first to third buttons 410-1 to 410-3, thereby adjusting the color. Also, the controller 420 may change the color using a white LED and a color filter.

In the above-described exemplary embodiments, the buttons provided on the control apparatus 400 have fixed shapes. However, each button may be implemented by using a touch button which displays a changeable indicator. The controller 420 may change the indicator of each button to correspond to each menu displayed on the terminal apparatus.

Figure 27:
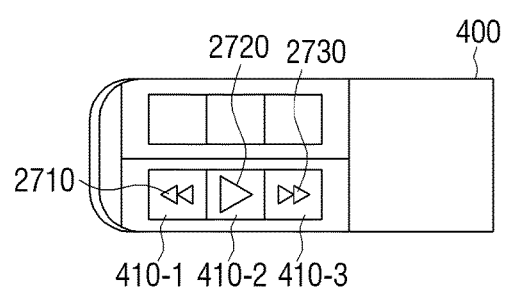
FIGS. 27 and 28 are views illustrating examples of a button indicator of a control apparatus according to another exemplary embodiment.
Figure 28:
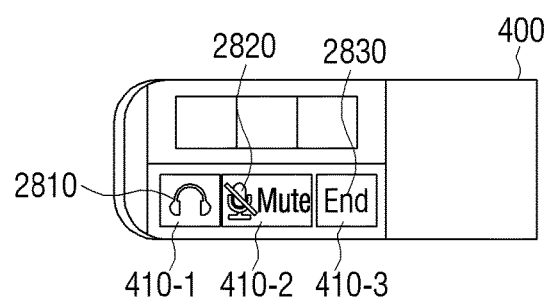

FIGS. 27 and 28 illustrate an operation of the control apparatus using a touch button according to an exemplary embodiment.

FIG. 27 illustrates three buttons 410-1 to 410-3 which are mapped to a rewind function, a play/pause function, and a fast forward function displayed on a content playback screen, respectively. The controller 420 may display indicators 2710, 2720, and 2730 indicating the respective functions on the touch buttons 410-1 to 410-3. The touch buttons 410-1 to 410-3 may be implemented by using a touch screen and may display various graphic objects.

FIG. 28 illustrates the buttons 410-1 to 410-3 which are mapped to a headset use function, a mute function, and a call rejection function displayed on a call reception screen. In this case, the controller 420 may delete the previous indicators 2710, 2720, and 2730 and instead may display indicators 2810, 2820, and 2830 corresponding to the headset use function, the mute function, and the call rejection function, respectively. Each of the indicators may be displayed in the form of an icon.

According to the exemplary embodiments explained in FIGS. 27 and 28, the user may know the state of the terminal apparatus 200 only by viewing the control apparatus 300 without viewing the screen of the terminal apparatus 200, and accordingly, may directly control the terminal apparatus 200.

On the other hand, according to still another exemplary embodiment, an identifier may be added to a menu displayed on the screen of the terminal apparatus 200 instead of the button of the control apparatus 400, such that the user can easily know which button is mapped to the menu.

Figure 29:
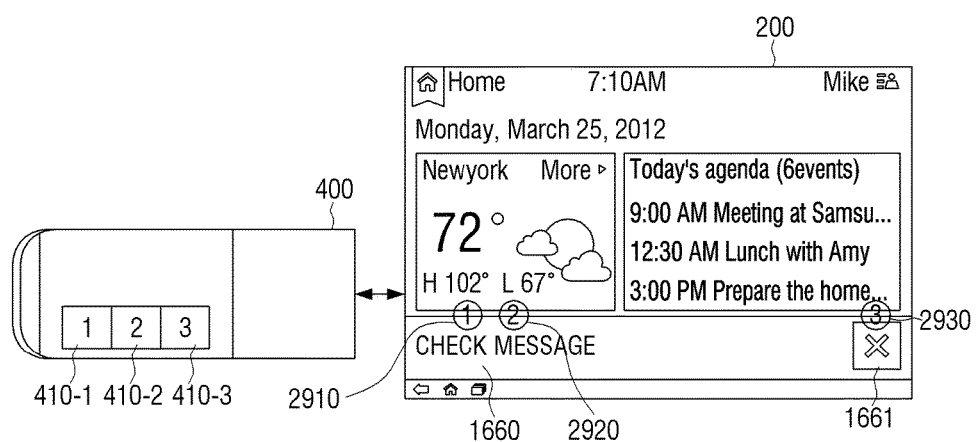
FIG. 29 is a view illustrating a configuration example of a screen of a terminal apparatus to map a button and a menu according to one or more exemplary embodiments.

FIG. 29 is a view illustrating operations of the control apparatus 400 and the terminal apparatus 200 according to this exemplary embodiment. Referring to FIG. 29, numbers or marks specifying the buttons 410-1 to 410-3 of the control apparatus 400 may be displayed on the buttons.

In this state, when a screen including a plurality of menus 1660 and 1661 is displayed on the terminal apparatus 200, the terminal apparatus 200 may display an identifier indicating the button mapped to each menu 1660 or 1661. Referring to FIG. 29, a notice message informing that a message has been received includes a check menu 1660 to check the received message and a refusal menu 1661 to refuse to check the message. As described above, the first and second buttons 410-1 and 410-2 may be mapped to the check menu 1660 and the third button 410-3 may be mapped to the refusal menu 1661. Accordingly, first and second identifiers 2910 and 2920 informing that the first and second buttons 410-1 and 410-2 are mapped to the check menu 1660 are displayed on the check menu 1660, and a third identifier 2930 informing that the third button 410-3 is mapped to the refusal menu 1661 is displayed on the refusal menu 1661. The user can easily grasp a mapped relationship between the button and the menu by viewing the identifier.

According to the above-described exemplary embodiments, the user can control the function of the terminal apparatus 200 mounted in the vehicle easily and safely using the separate control apparatus.

On the other hand, when the terminal apparatus 200 and the mobile device 100 are interlocked with each other as described above, an execution screen of an application executed in the mobile device 100 may be displayed on the terminal apparatus 200. However, since the size and shape of the display 130 of the mobile device 100 are mostly different from the size and shape of the display of the terminal apparatus 200, there is a problem that it is difficult to display the image on the screen of the mobile device 100 on the terminal apparatus 20 as it is.

Hereinafter, still another exemplary embodiment to solve this problem will be explained.

Figure 30:
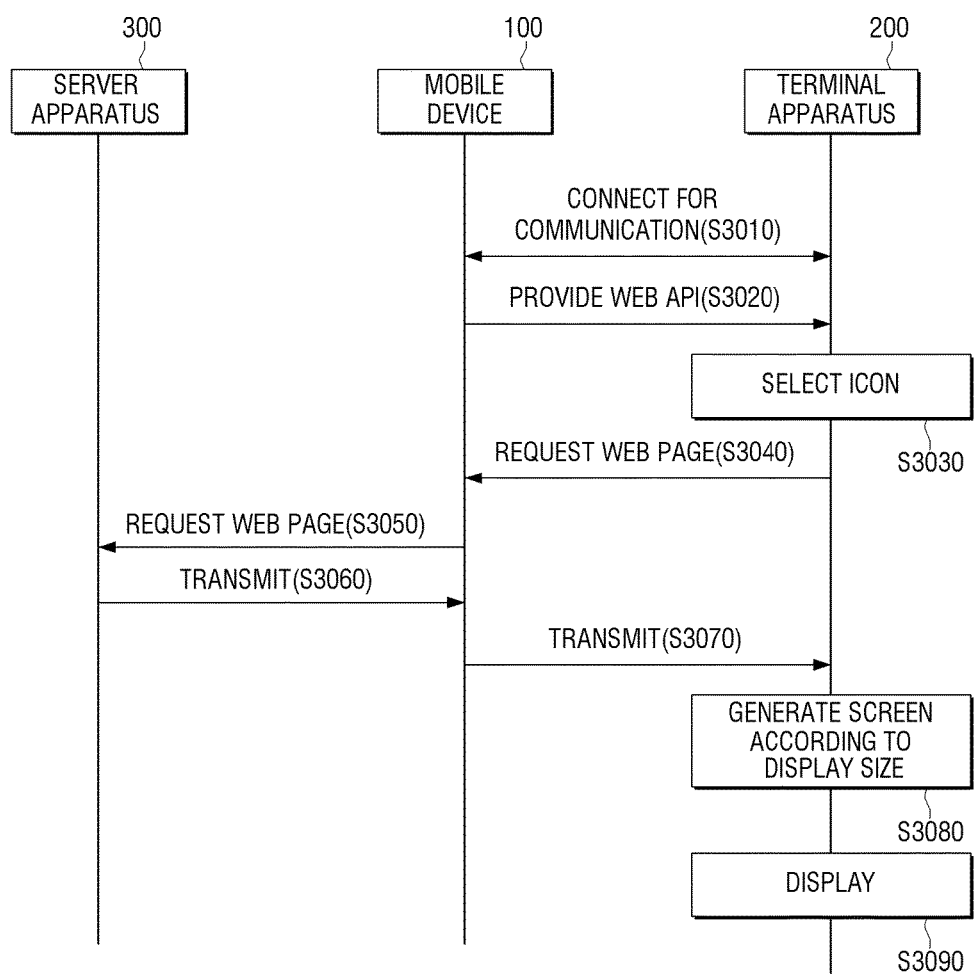
FIG. 30 is a timing chart illustrating an operation of a vehicle control system according to another exemplary embodiment.

FIG. 30 is a timing chart illustrating a method for optimizing a screen of a system according to still another exemplary embodiment.

Referring to FIG. 30, when a mobile device 100 and a terminal apparatus 200 are connected with each other for communication (S3010), the mobile device 100 provides a list of applications generated by using a web application programming interface (API) to the terminal apparatus 200 (S3020). For example, the mobile device 100 may provide an API according to hypertext markup language 5 (HTML5).

The terminal apparatus 200 displays an icon of each application on the screen according to the provided list. In this state, when one icon is selected (S3030), the terminal apparatus 200 requests a web page corresponding to the selected icon from the mobile device 100 (S3040).

When a web page request is received, the mobile device 100 requests the web page from a corresponding server apparatus 300 again (S3050), and, when corresponding web page data is received (S3060), the mobile device 100 transmits the web page data to the terminal apparatus 200 (S3070).

When the web page data is received, the terminal apparatus 200 generates a screen according to its display size (S3080) and displays the screen (S3090).

Figure 31:
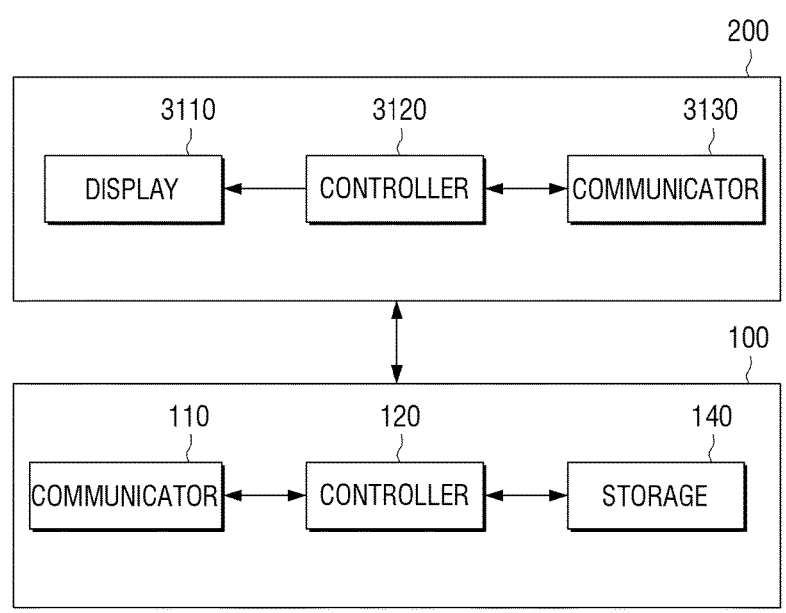
FIG. 31 is a block diagram illustrating configurations of a mobile device and a terminal apparatus which are included in the vehicle control system of FIG. 30.

FIG. 31 is a block diagram illustrating a configuration of the terminal apparatus which is operated according to the exemplary embodiment of FIG. 30. Referring to FIG. 31, the terminal apparatus 200 includes a display 3110, a controller 3120, and a communicator 3130.

The display 3110 is an element for displaying various screens. The display 3110 may have various sizes and shapes according to a price, a kind, and a use environment of the terminal apparatus 200.

The communicator 3130 is an element for communicating with the mobile device 100. When the terminal apparatus 200 is connected with the mobile device 100, the communicator 3130 may access a web server using the web API provided by the mobile device 100. Accordingly, the communicator 3130 may receive web page data from the web server.

The controller 3120 may configure a screen corresponding to the screen size of the display using the web page data, and may display the screen on the display 3110.

Specifically, when the terminal apparatus 200 is connected with the mobile device 100, the controller 3120 receives a list of applications installed in the mobile device 100 and displays the list of applications on the display 3110. When the user selects one of the applications displayed on the list, the controller 3120 requests web page data related to the selected application. The mobile device 100 receives the web page data from the web server and relays it to the terminal apparatus 200 according to the request. When the web page data is received through the mobile device 100, the controller 3120 may configure a screen appropriate to the display 3110 according to the web page data.

Accordingly, even when the size and shape of the display of the terminal apparatus 200 are different from those of the mobile device 100, the screen is configured using a web-based technique such as HTML5, such that an execution screen of the same application as the application installed in the mobile device 100 can be optimized and displayed on the terminal apparatus 200.

The mobile device 100, which communicates with the terminal apparatus 200, includes a communicator 110, a controller 120, and a storage 140. The same elements as those of the mobile device 100 explained in the exemplary embodiment of FIG. 3 may use the same names and reference numerals.

The communicator 110 communicates with the communicator 3130 of the terminal apparatus 200.

When communication with the terminal apparatus 200 is established, the controller 120 generates a list of applications installed in the storage 140 and transmits the list of applications to the terminal apparatus 200 through the communicator 110. In addition, the controller 120 may transmit photos, moving image contents, a list of addresses, schedule information, and social network service (SNS) information stored in the storage 140 to the terminal apparatus 200. Although certain data items stored in the storage 140 may be transmitted to the terminal apparatus 200 have been listed, exemplary embodiments are not limited to the transmission of the listed items.

After that, when one application is selected on the terminal apparatus 200, the controller 120 downloads web page data from a web server corresponding to the selected application, and transmits the web page data to the terminal apparatus 200. Accordingly, the terminal apparatus 200 configures an application screen of the mobile device adaptively according to its display characteristic and displays the application screen.

Figure 32:
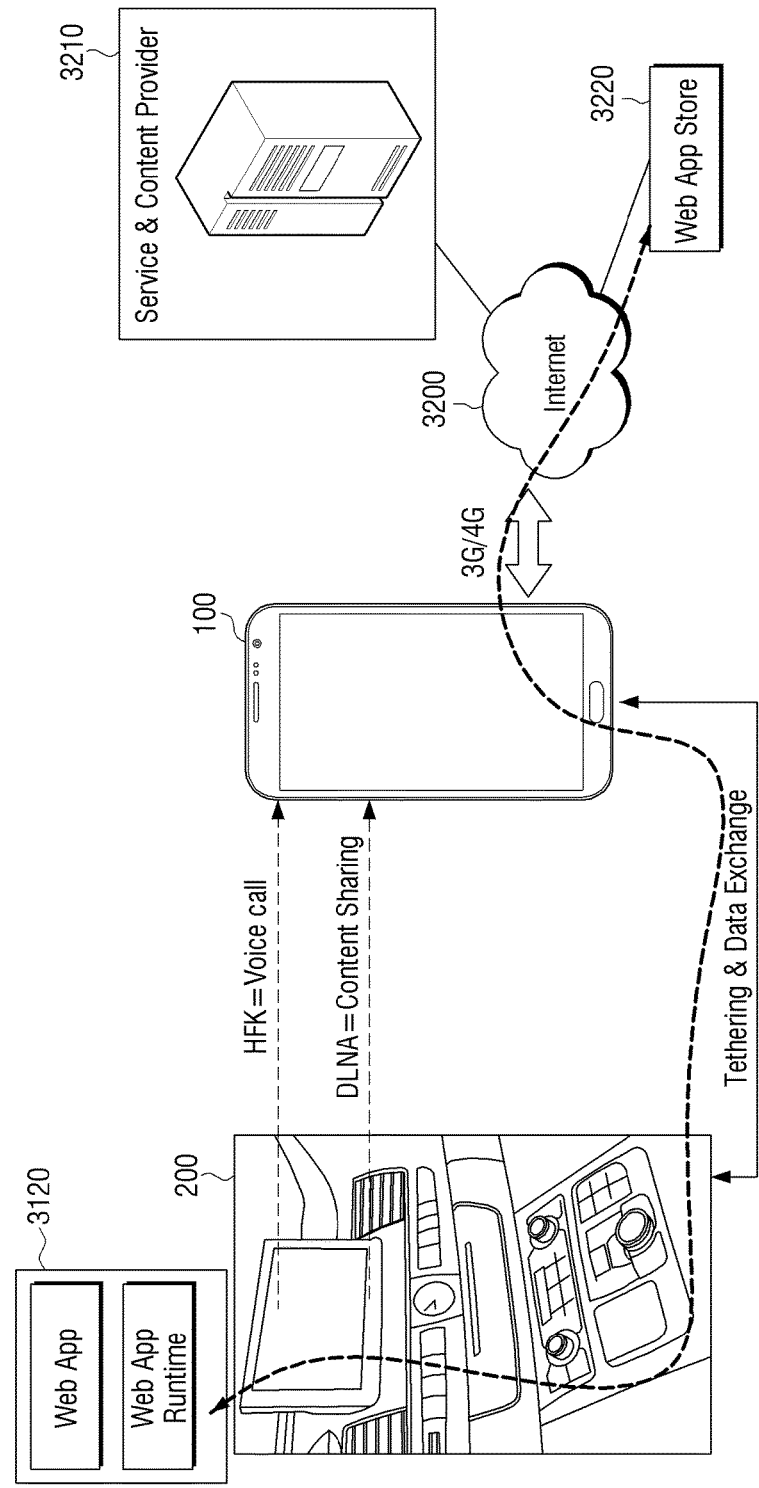
FIG. 32 is a view illustrating operations of the mobile device and the terminal apparatus of FIG. 31.

FIG. 32 is a view illustrating a process in which the terminal apparatus 200 displays a screen using a web-based technique. Referring to FIG. 32, the terminal apparatus 200 is connected with the mobile device 100 for communication in various communication methods such as USB, Wi-Fi, Bluetooth, etc. The mobile device 100 may access a service and content provider server 3210 or a web application store 3220 through the Internet 3200. The terminal apparatus 200 receives web page data provided by the service and content provider server 3210 or the web application store 3220 through the mobile device 100.

The controller 3120 of the terminal apparatus 200 configures a screen of an application using the web page data, and displays the screen. Although in FIG. 32 the terminal apparatus 200 configures a screen, exemplary embodiments are not limited thereto. As a non-limiting example, the mobile device 100 may configure the screen before transmitting it to the terminal apparatus.

Figure 33:
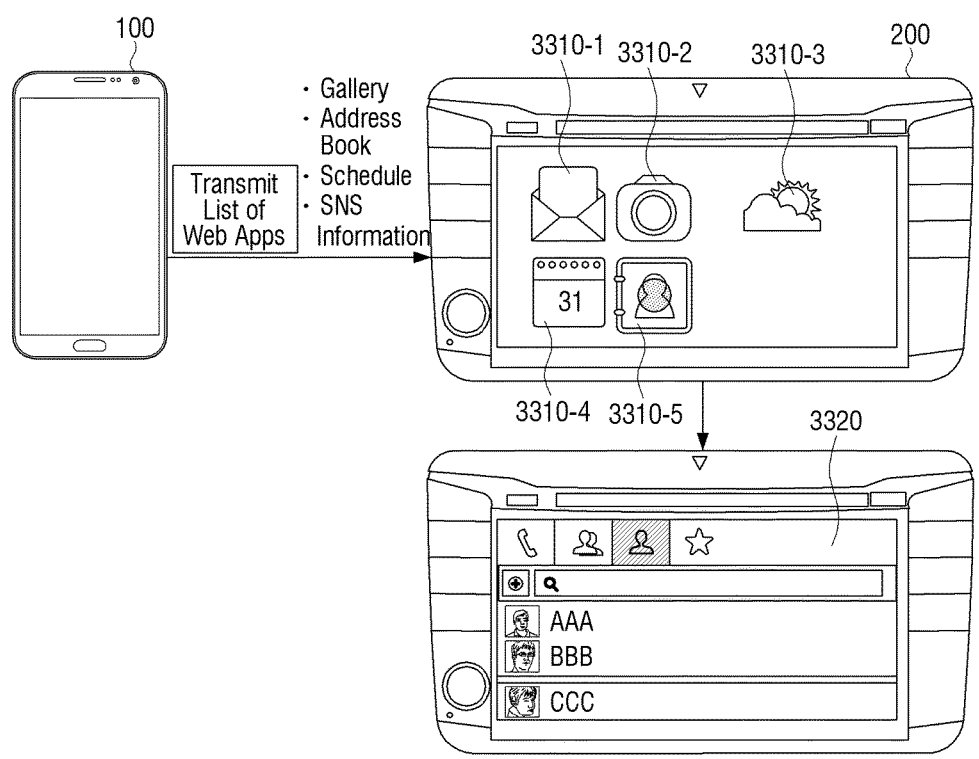
FIG. 33 is a illustrating a configuration example of a screen of the terminal apparatus of FIG. 31.

FIG. 33 is a view illustrating a configuration example of a screen displayed on the terminal apparatus 200. Referring to FIG. 33, the mobile device 100 transmits a list of web applications and a variety of additional information to the terminal apparatus 200. The additional information may include gallery information including photos and moving image contents, address information, schedule information, SNS information, etc.

The terminal apparatus 200 displays icons 3310-1 to 3310-5 related to the applications installed in the mobile device 100 according to the list of web applications. In this state, when one icon 3310-5 is selected, the terminal apparatus 200 receives web page data corresponding to the icon 3310-5 from a server apparatus through the mobile device 100. Accordingly, the terminal apparatus 200 configures a screen 3320 using the received web page data. The additional information stored in the mobile device 100 may also be displayed on the screen 3320. That is, when the selected icon 3310-5 is a contact information icon in FIG. 33, the terminal apparatus 200 may display the screen 3320 including address information from among the additional information provided from the mobile device 100.

According to the above-described exemplary embodiment, the terminal apparatus 200 may display a screen optimized for the terminal apparatus 200 using the application and the information installed in the mobile device 100.

According to still another exemplary embodiment, even when the mobile device 100 does not install a specific application for controlling the terminal apparatus 200, the mobile device 100 may control the terminal apparatus 200. Hereinafter, an operation of a mobile device that controls a terminal apparatus using a web browser will be explained.

Figure 34:
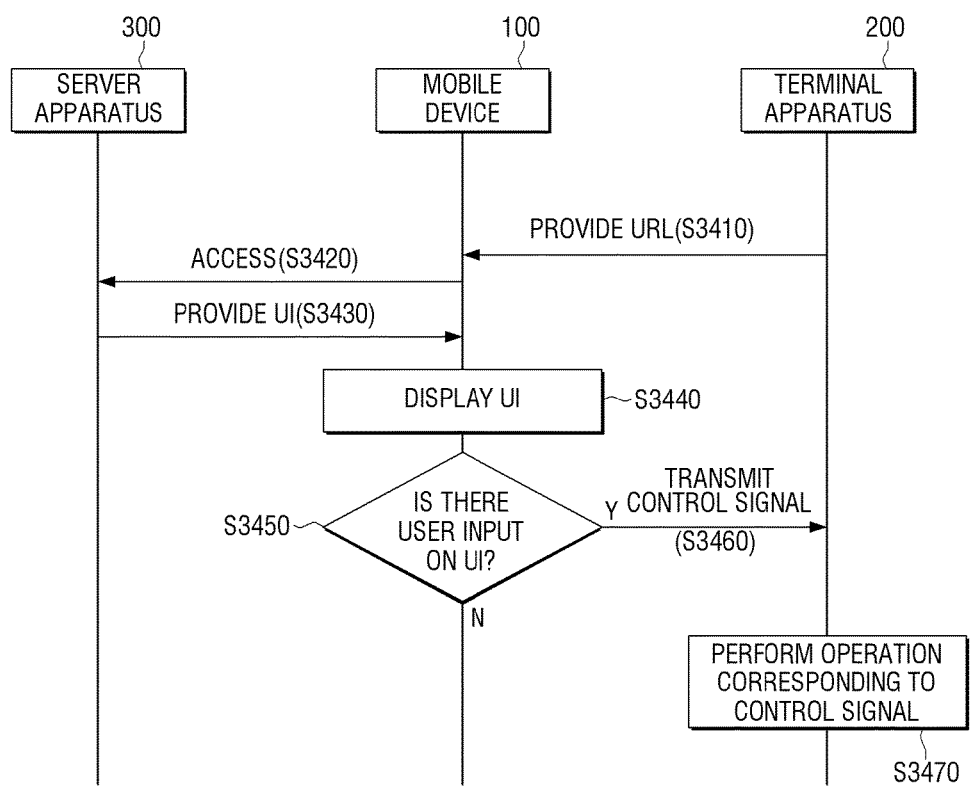
FIG. 34 is a timing chart illustrating an operation of a vehicle control system according to another exemplary embodiment.

FIG. 34 is a view illustrating an operation of a mobile device which controls a terminal apparatus according to still another exemplary embodiment.

Referring to FIG. 34, a mobile device 100 receives a uniform resource locator (URL) from a terminal apparatus 200 (S3410). The URL refers to an address of a server apparatus corresponding to the terminal apparatus 200. The terminal apparatus 200 stores an URL of a server apparatus that is run by a manufacturer of the terminal apparatus 200, a manufacturer of software or other contents used in the terminal apparatus 200, or a third party in advance, and provides the URL when communication with the mobile device 100 is established. The terminal apparatus 200 may provide the URL in an NFC communication method.

When the URL is received, the mobile device 100 executes a web browser and accesses the URL (S3420). Accordingly, the mobile device 100 receives a UI provided by a server apparatus 300 (S3430), and displays the received UI on the web browser (S3440).

The user may control the terminal apparatus 200 using the displayed UI. That is, when there is user input on the UI (S3450), the mobile device 100 transmits a control signal corresponding to the user input (S3460).

When the control signal is received, the terminal apparatus 200 performs an operation corresponding to the control signal (S3470). For example, the terminal apparatus 200 may perform various operations such as turning on, turning off, turning up a volume, turning down a volume, changing a channel, playing back a content, pausing, fast forwarding, rewinding, changing a content, executing a navigation function, setting a destination, etc.

In FIG. 34, the mobile device 100 receives address information, that is, a URL, from the terminal apparatus and receives a UI from the URL. However, the mobile device 100 may receive web page data from the URL. Accordingly, the mobile device 100 may transmit the received web page data to the terminal apparatus 200. The terminal apparatus 200 may configure an adaptive screen corresponding to its display characteristic by using a web browser and may display the screen. Alternatively, the mobile device 100 may configure an adaptive screen for the terminal apparatus 200 using the received web page data by itself, and then may transmit the screen to the terminal apparatus 200. As described above, the mobile device 100 may perform various functions using the address information stored in the terminal apparatus 200, that is, the URL, according to an exemplary embodiment.

Figure 35:
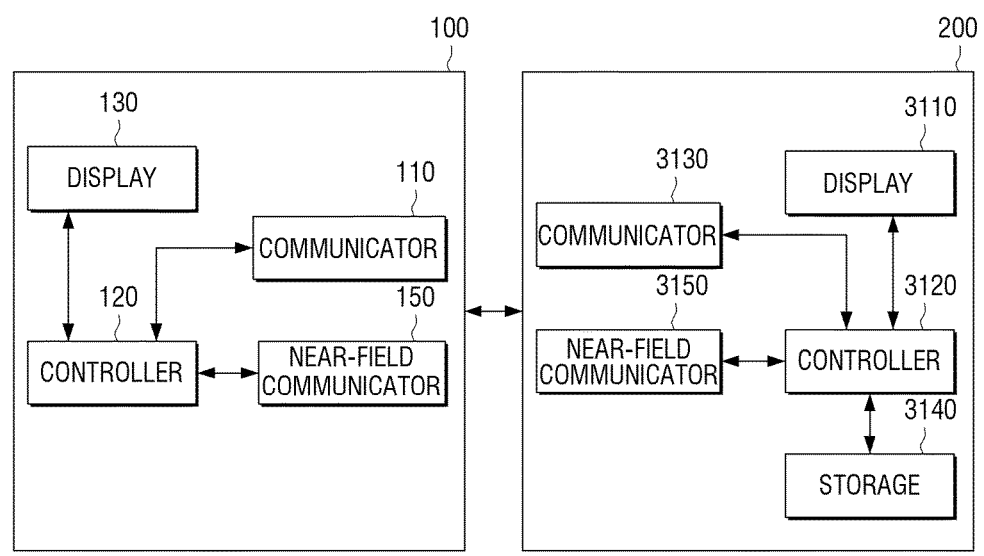
FIG. 35 is a block diagram illustrating configurations of a mobile device and a terminal apparatus which are included in the vehicle control system of FIG. 34.

FIG. 35 is a block diagram illustrating configurations of the mobile device 100 and the terminal apparatus 200 according to the exemplary embodiment of FIG. 34.

Referring to FIG. 35, the mobile device 100 includes a communicator 110, a controller 120, a display 130, and a near-field communicator 150. The terminal apparatus 200 includes a display 3110, a controller 3120, a communicator 3130, a storage 3140, and a near-field communicator 3150.

When the near-field communicator 150 of the mobile device 100 is tagged with the near-field communicator 3150 of the terminal apparatus 200, the near-field communicator 150 and the near-field communicator 3150 exchange data with each other in an NFC method. Specifically, the near-field communicator 150 of the mobile device 100 may read URL information stored in the storage 3140 of the terminal apparatus 200.

The near-field communicator 150 of the mobile device 100 provides the read URL information to the controller 120. The controller 120 controls the communicator 110 to access the read URL and receive web page data. The web page data refers to data for configuring a UI screen. Also, the near-field communicator 150 of the mobile device 100 and the near-field communicator 3150 of the terminal apparatus 200 each may include an NFC tag and an NFC reader. Accordingly, the controller 120 executes a web browser and displays a UI screen according to the received web page data on the display 130.

After that, when the user selects a certain menu on the UI screen displayed on the display 130, the controller 120 transmits a control signal to execute the selected menu to the terminal apparatus 200 through the communicator 110.

The communicator 3130 of the terminal apparatus 200 receives the control signal and transmits the control signal to the controller 3120. The controller 3120 displays various screens according to the received control signal on the display 3110.

As described above, the mobile device 100 and the terminal apparatus 200 are different kinds of apparatuses, but are interlocked with each other and provide various services.

In the above-described exemplary embodiments, the terminal apparatus 200 may not necessarily be mounted on a means of transportation such as a vehicle, and the above-described exemplary embodiments may be applied to any kind of apparatus which is different from the mobile device.

According to still another exemplary embodiment, the operation of the terminal apparatus 200 may be controlled using a user's voice. Hereinafter, a method for controlling using a user's voice according to an exemplary embodiment will be explained in detail.

Figure 36:
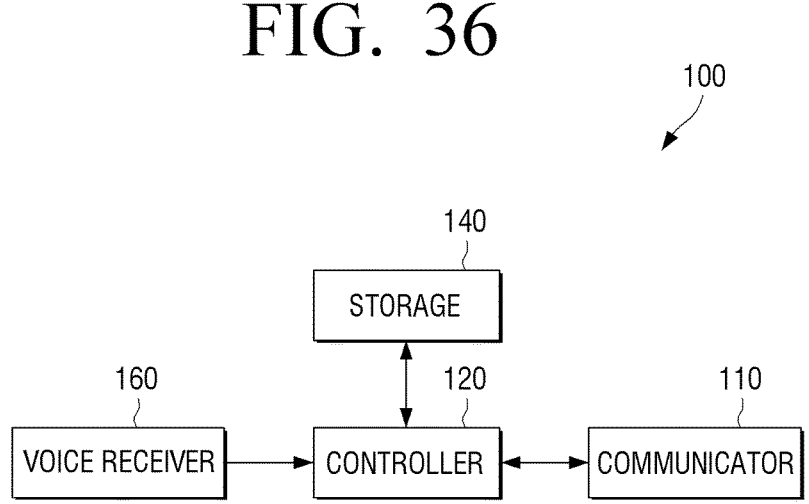
FIG. 36 is a block diagram illustrating a configuration of a mobile device according to another exemplary embodiment.

FIG. 36 is a block diagram illustrating a configuration of a mobile device according to still another exemplary embodiment. Referring to FIG. 36, a mobile device 100 includes a communicator 110, a controller 120, a storage 140, and a voice receiver 160. For convenience of explanation, the same elements as those of the mobile device described in the above exemplary embodiments use the same names and reference numerals. However, the functions of the elements may be differently implemented according to exemplary embodiments.

In FIG. 36, the communicator 110 may communicate with a terminal apparatus 200 which is mounted in a vehicle. A detailed communication method has been mentioned in the above-described exemplary embodiments and thus a redundant explanation is omitted.

The voice receiver 160 is an element for receiving input of a user voice. The voice receiver 160 may include various elements such as a microphone (not shown), an amplifier (not shown), a noise filtering circuit (not shown), etc. The voice receiver 160 transmits the input user voice to the controller 120.

The storage 140 is an element for storing various programs and data used in the mobile device 100.

The controller 120 may control an overall function of the mobile device 100 using the program and data stored in the storage 140.

Specifically, the controller 120 may set a different search criterion according to a state of a user who uses the mobile device 100. When a user voice is input through the voice receiver 160, the controller 120 analyzes the input user voice. The user voice may be analyzed in various ways. For example, the controller 120 calculates energy of the received user voice, classifies an energy level of a voice signal according to the calculated energy, and detects a voice section based on the energy level. The controller 120 detects a phoneme, which is a minimum unit of a voice, from the detected voice section based on an acoustic model, generates phonemic data, and converts the user voice into text by applying a hidden Markov model (HMM) to the generated phonemic data. The controller 120 may detect a command and a search word from the converted text. Specifically, the controller 120 detects the text registered at a command database stored in the storage 140 as a command. The controller 120 may detect the non-registered text as a search key word. The controller 120 may perform various functions using the detected command and search key word.

For example, when a command to search for a destination is detected, the controller 120 searches for a destination corresponding to a search word. In this case, a search criterion for searching for a destination may be set differently according to a state of the user as described above.

The controller 120 searches for at least one destination corresponding to the user voice using the set search criterion. The controller 120 provides a result of the searching to the terminal apparatus 200 through the communicator 110. Accordingly, destination candidates which are selected considering the user voice and the user state may be displayed on the terminal apparatus 200. When the user selects one of the destination candidates, the selected destination candidate is determined to be a destination and the terminal apparatus 200 may perform the navigation function to navigate to the determined destination.

The user state recited herein may indicate whether the user is driving or not, or whether the user is walking or taking a rest. Also, the user state may be determined based on a variety of information such as a current location of the user and a next schedule. When it is determined that the user is driving, the controller 120 may set a search criterion so that a destination providing a vehicle-related service is searched first. On the other hand, when the user's next schedule is tight, the controller 120 may set a search criterion so that a destination providing a fast service is searched first. When the user is not in a special situation, the controller 120 may search for a destination according to a normal navigation destination setting option such as a shortest distance criterion, a shortest time criterion, an optimal path criterion, etc.

Figure 37:
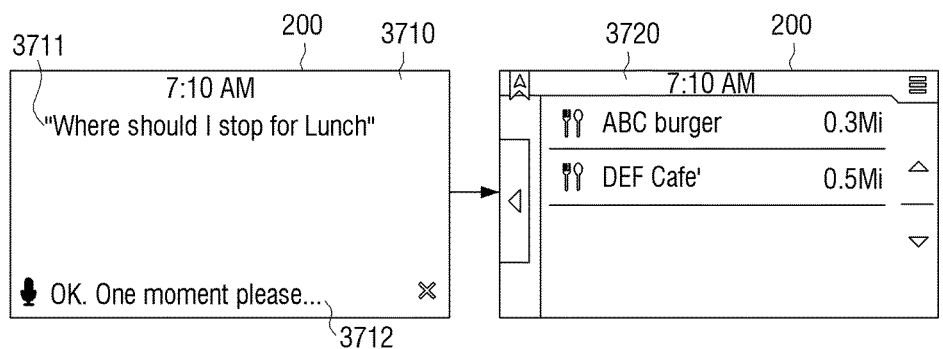
FIG. 37 is a view illustrating a configuration example of a screen of a terminal apparatus which is controlled by the mobile device of FIG. 36.

FIG. 37 is a view illustrating an example of a process of searching for a destination. FIG. 37 illustrates a screen configuration of the terminal apparatus 200 which is controlled by the mobile device 100.

When the user says "Where should I stop for lunch?" while driving, the voice receiver 160 of the mobile device 100 receives the input voice and provides the input voice to the controller 120. As described above, the controller 120 converts the input voice into text and displays the text through the display 130.

When the communicator 110 of the mobile device 100 communicates with the terminal apparatus 200 mounted in the vehicle, the controller 120 may determine that the user is driving or gets ready to drive. Also, the controller 120 may detect the word "where" of the user voice as a command to find something, and may detect the word "lunch" as a search word. The controller 120 may detect a relevant search word in addition to the directly detected search word. For example, in the case of "lunch", the controller 120 may detect various words such as "restaurant", "food store", "food court", etc as relevant search words.

The controller 120 sets a place providing a vehicle-related service as a search criterion considering that the user is driving, and searches for a restaurant related to the search word according to the search criterion. For example, the controller 120 may search for a restaurant with a parking lot, a drive-in restaurant where the user can drive in with a car and take food, a restaurant located near to a vehicle service station or a car wash.

In FIG. 37, the user said "Where should I stop for lunch?". The controller 120 converts the input voice uttered by the user into text, and transmits the converted text 3711, the search word, and the command to the terminal apparatus 200. The search word includes relevant search words.

The terminal apparatus 200 displays a screen 3710 including the received text 3711 on the display. The screen 3710 may also display a message 3712 informing that a search is in progress. Also, the terminal apparatus 200 executes a navigation program and detects destination candidates including the received search word. The terminal apparatus 200 displays a screen 3720 including the detected destination candidates. In FIG. 37, the destination candidates that are searched considering that the user is driving are displayed. When the user selects one of the destination candidates, the terminal apparatus 200 determines the selected destination candidate as a final destination, and executes a navigation function to navigate from the current location to the final destination.

On the other hand, the storage 140 may store user schedule information. In this case, the controller 120 may check user's next schedule based on the user schedule information. When there is a next schedule as a result of the checking, the controller 120 may set a search criterion so that a destination is searched according a next schedule time or place. That is, when the next schedule time is not far off from the present time, the controller 120 may set a search criterion so that a fast food restaurant or a drive-in restaurant is searched first. Also, when the next schedule place is stored, the controller 120 may set a search criterion so that a restaurant located within a route to the next schedule place is searched first.

On the other hand, when communication with the terminal apparatus 200 is not established and a user voice is input, the controller 120 may search for a destination autonomously. When the mobile device 100 is equipped with a display, the controller 120 may display a navigation screen to navigate to the searched destination on the display. On the other hand, when the mobile device 100 is not equipped with the display, the controller 120 may output a guide voice to guide the user to the searched destination through a speaker. In this case, the shortest distance or the shortest time may be set as a search criterion. Alternatively, a search criterion so that a place selected by the majority of users is searched or a destination is searched in popularity order may be set.

In FIGS. 36 and 37, the mobile device 100 analyzes the user voice and determines the search criterion. However, the mobile device 100 may transmit the user voice to an external server apparatus such that the server apparatus performs such operations.

Figure 38:
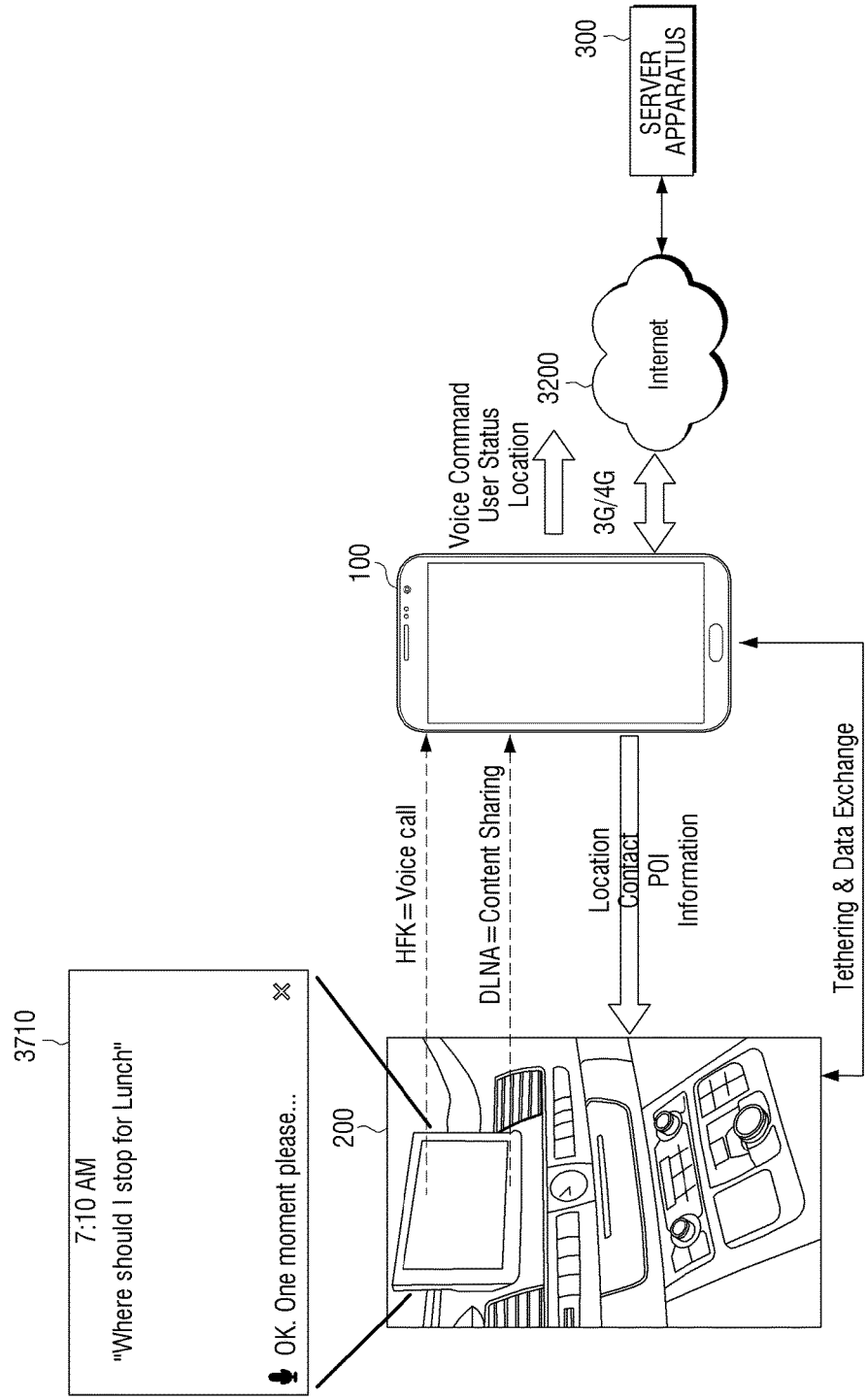
FIG. 38 is a view illustrating an operation of a vehicle control system which is controlled according to a user voice according to one or more exemplary embodiments.

FIG. 38 is a view illustrating a network system according to this exemplary embodiment. Referring to FIG. 38, when a user voice is input, a mobile device 100 may transmit the voice, user state information, and location information to a server apparatus 300 through the Internet. The server apparatus 300 may be implemented by using a server apparatus providing a voice analysis service, a navigation service, etc. The server apparatus 300 may search for a destination based on the user voice, the user state information, and the location information, and may provide a result of the searching to the mobile device 100. The mobile device 100 transmits the result of the searching to the terminal apparatus 200 such that the terminal apparatus 200 displays a corresponding screen 3710.

Figure 39:
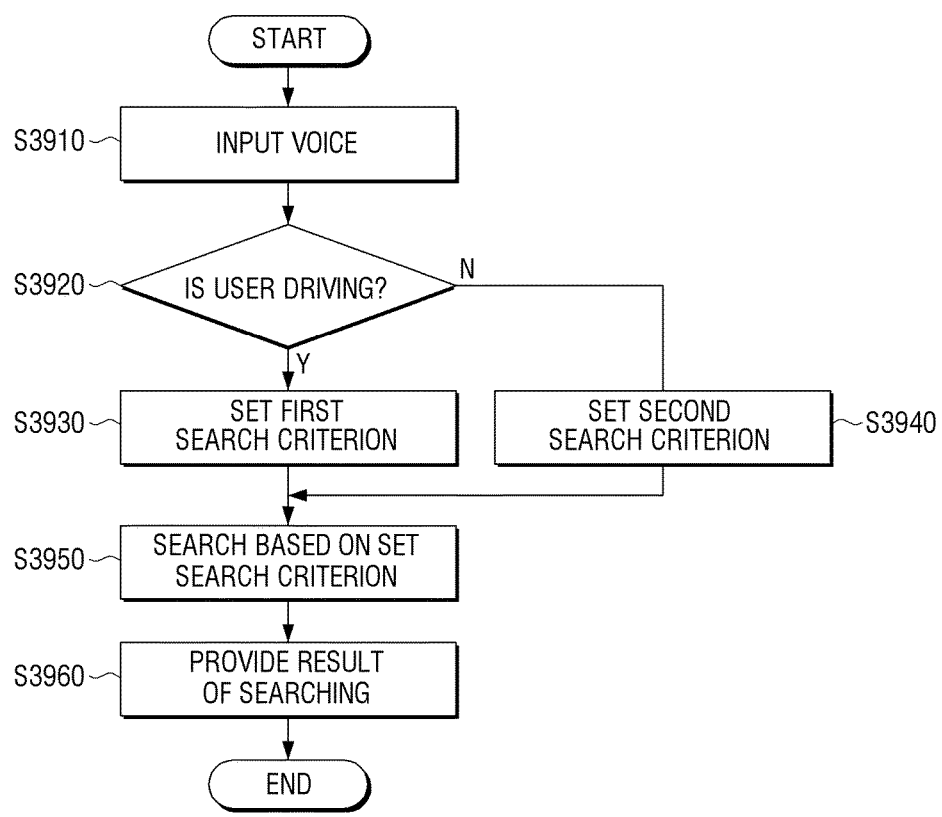
FIGS. 39 and 40 are flowcharts illustrating various examples of a method for controlling a terminal apparatus according to a user voice according to one or more exemplary embodiments.

FIG. 39 is a flowchart illustrating a method for searching for a destination according to an exemplary embodiment. Referring to FIG. 39, when a user voice is input (S3910), the mobile device 100 determines whether the user is driving or not (S3920). Briefly, when communication with the terminal apparatus 200 is established, the mobile device 100 determines that the user is driving. Also, when there is a change in coordinates provided by a global positioning system (GPS) chip of a vehicle on which the terminal apparatus 200 is mounted, the mobile device 100 determines that the user is driving.

When it is determined that the user is driving, the mobile device 100 sets a first search criterion (S3930). Specifically, the mobile device 100 sets the first search criterion so that destination candidates that provide a vehicle-related service from among destination candidates including search words are searched first. On the other hand, when it is determined that the user is not driving, the mobile device 100 may set a second search criterion (S3940). The second search criterion may be a normal navigation search option such as the shortest time, the shortest distance, the optimal route, etc.

The mobile device 100 searches for a destination based on the set search criterion (S3950). The mobile device 100 provides a result of the searching through the terminal apparatus 200.

Figure 40:
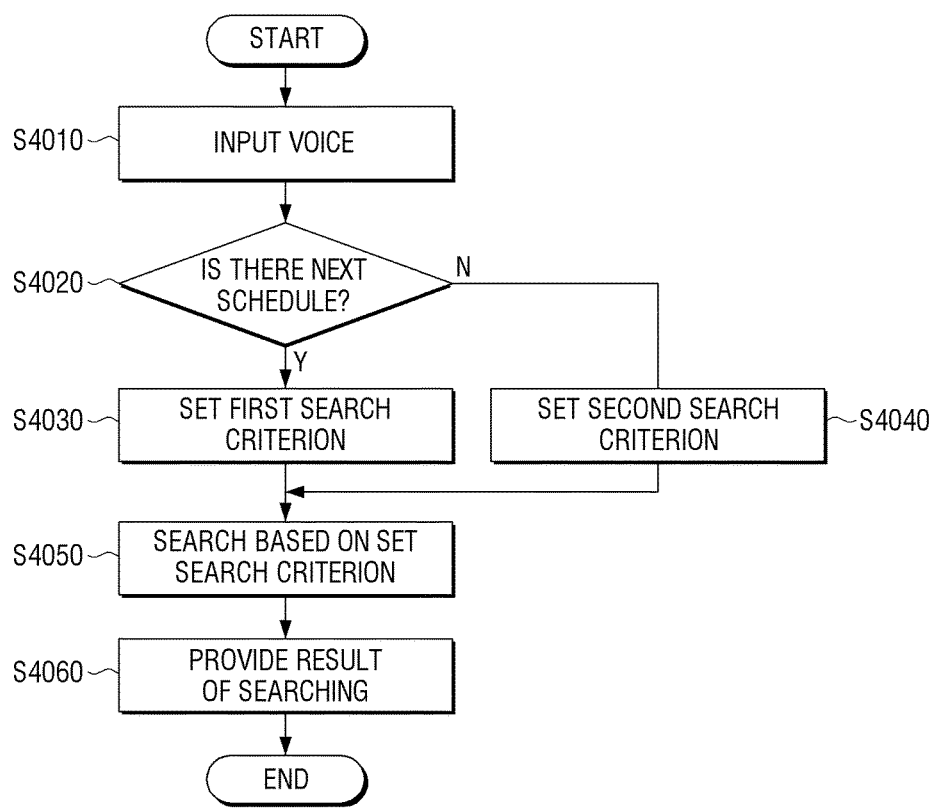

FIG. 40 is a flowchart illustrating a method for searching for a destination according to another exemplary embodiment. Referring to FIG. 40, when a user voice is input (S4010), the mobile device 100 determines whether there is a next schedule or not (S4020).

When it is determined that there is the next schedule, the mobile device 100 sets a first search criterion (S4030), and, when it is determined that there is no next schedule, the mobile device 100 sets a second search criterion (S4040). The first search criterion is a criterion so that destination candidates are searched considering a next schedule time or place, and the second search criterion is a normal navigation search option as described above. When the search criterion is determined, the mobile device searches for a destination based on the determined search criterion (S4050), and provides a result of the searching through the terminal apparatus 200.

As described above, an appropriate destination may be searched according to a user's situation. On the other hand, the user inputs a voice in the above-described exemplary embodiments. However, when the user directly inputs text, the search criterion may be set differently according to the user's state and the search may be conducted. Also, in the above-described exemplary embodiments, the mobile device 100 receives the voice, sets the search criterion, and detects the search word or command. However, this should not be considered as limiting. For example, as explained in FIG. 38, the external server apparatus 300 may perform such operations or the terminal apparatus 200 may directly receive the user voice, set the search criterion, and conduct the search based on the search criterion, without intervention of the mobile device 100.

On the other hand, according to still another exemplary embodiment, the terminal apparatus 200 may provide a location-based service using metadata stored in the mobile device 100. Hereinafter, an exemplary embodiment of a method for using metadata will be explained.

Figure 41:
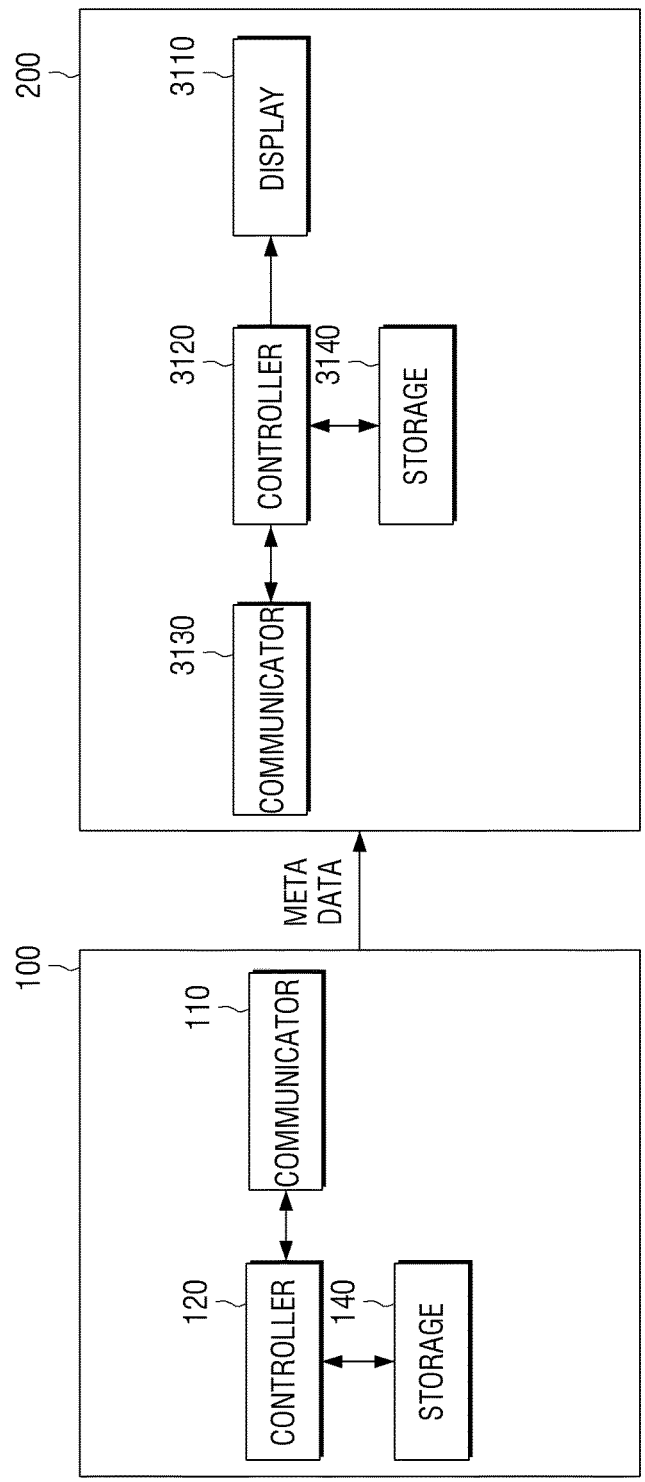
FIG. 41 is a block diagram illustrating a configuration of a vehicle control system according to an exemplary embodiment.

FIG. 41 is a block diagram illustrating a method for providing various services using metadata of a mobile device according to an exemplary embodiment.

Referring to FIG. 41, a mobile device 100 may provide metadata to a terminal apparatus 200. The terminal apparatus 200 includes a display 3110, a controller 3120, a communicator 3130, and a storage 3140.

Various applications may be installed in the storage 3140. Specifically, a navigation program, a multimedia content playback program, a schedule management program, etc. may be installed. Beside these, map data used in each application, address information, schedule information, multimedia contents, etc. may also be stored in the storage 3140.

The communicator 3130 is an element for communicating with the mobile device and receiving the metadata. The communicator 3130 provides the received metadata to the controller 3120. The metadata refers to data that is additionally provided regarding various data such as photos, moving images, a list of addresses, schedule information, etc. stored in the mobile device. For example, in the case of a content like a photo or a moving image, a place where the photo or the moving image is photographed, or the date and time of the photographing may be stored in the form of metadata. Also, in the case of schedule information, location information of a place where the schedule is carried out may be stored in the form of metadata.

When the metadata is received through the communicator 3130, the controller 3120 configures various screens using the metadata and displays the screens on the display 3110. Specifically, the controller 3120 executes an application installed in the storage 3140, and provides the metadata as input to the application. Accordingly, the application executes a function based on the metadata. When the application configures an execution screen using the metadata, the controller 3120 displays the execution screen on the display 3110.

The application to be executed may be selected by the user. That is, when the terminal apparatus 200 is powered on, the controller 3120 may display icons corresponding to applications installed in the storage 3140 on the display 3110. When the user selects an icon by touching the screen of the display 3110 or using the mobile device or a user voice as described above, the controller 3120 executes an application corresponding to the selected icon and displays a corresponding execution screen on the display 3110. At this time, the controller 3120 may change the execution screen using location information of the metadata provided by the mobile device 100.

On the other hand, when communication with the mobile device 100 is established, the controller 3120 may display icons corresponding to applications installed in the mobile device 100 on the display 3110 along with the icons corresponding to the applications installed in the terminal apparatus 200. When the user selects an icon corresponding to an application installed in the mobile device 100, the controller 3120 configures a screen using location information corresponding to the selected icon and displays the screen on the display 3110.

Referring to FIG. 41, the mobile device 100 includes a communicator 110, a controller 120, and a storage 140. The communicator 110 is an element for communicating with the terminal apparatus 200.

The storage 140 is an element in which various applications and data are stored. Specifically, the metadata including location information may be stored in the storage 140.

When communication with the terminal apparatus 200 is established, the controller 120 provides the metadata to the terminal apparatus 200. At this time, when the communication is established, the controller 120 may automatically transmit the whole metadata to the terminal apparatus 200. Alternatively, when an event in which an icon of an application installed in the mobile device is selected on the screen of the terminal apparatus 200 occurs, the controller 120 may transmit all metadata related to the corresponding application to the terminal apparatus 200. Also, when an execution screen of a specific application is mirrored on the terminal apparatus 200 and displayed and one content is selected, the controller 120 may transmit only the metadata of the content to the terminal apparatus 200.

When the metadata is provided to the terminal apparatus 200 as described above, the terminal apparatus 200 may display a service screen based on location information.

Figure 42:
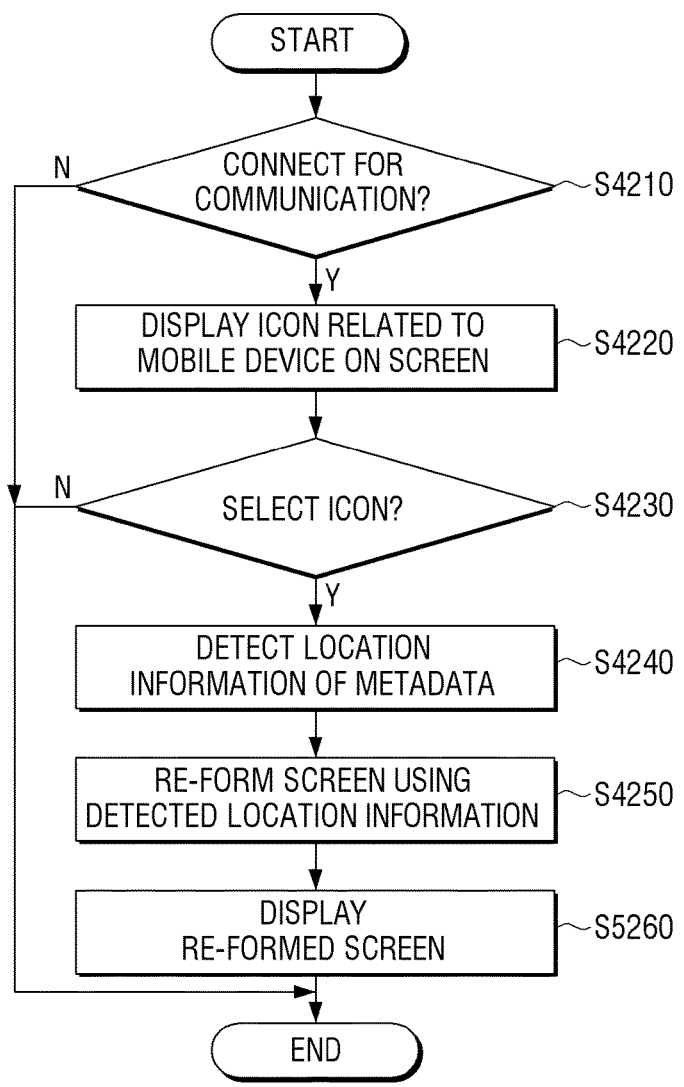
FIG. 42 is a flowchart illustrating an example of an operation of the vehicle control system of FIG. 41.

FIG. 42 is a flowchart illustrating a method for using metadata of a terminal apparatus according to an exemplary embodiment. Referring to FIG. 42, when communication with the mobile device 100 is established (S4210), the terminal apparatus 200 displays an icon related to the mobile device on the screen (S4220). After that, when the displayed icon is selected (S4230), the terminal apparatus 200 detects location information from metadata corresponding to the selected icon (S4240). For example, when an icon corresponding to a gallery program is selected, the terminal apparatus 200 may detect location information of a place where a photo or a moving image is photographed from the metadata of the photo or the moving image included in the gallery program. When the gallery program manages a plurality of photos or moving images, only the location information of the content selected by the user from among the plurality of contents may be detected.

When the location information is detected, the terminal apparatus 200 reconfigures a screen using the detected location information (S4250). Specifically, the terminal apparatus 200 may automatically set the detected location information as a destination and may configure a navigation screen navigating to the destination. The terminal apparatus 200 may display the reconfigured screen (S4260). As described above, the terminal apparatus 200 may provide various services using the location information stored in the mobile device 100.

Figure 43:
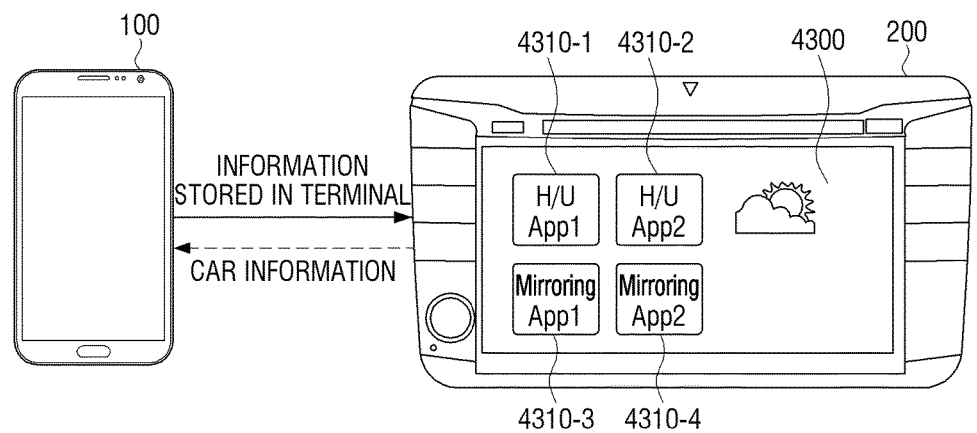
FIG. 43 is a view illustrating a configuration example of a screen of a terminal apparatus which is mirrored with a mobile device according to one or more exemplary embodiments.

FIG. 43 illustrates a configuration example of a screen of the terminal apparatus 200 which is connected with the mobile device 100. Referring to FIG. 43, when the terminal apparatus 200 is connected with the mobile device 100, icons 4310-3 and 4310-4 corresponding to applications installed in the mobile device 100 are displayed on a screen 4300 of the terminal apparatus 200 in addition to existing icons 4310-1 and 4310-2. These icons 4310-1 to 4310-4 may be displayed in the form of a list or tile view in alphabetical order or chronological order.

In FIG. 43, the icons 4310-1 to 4310-4 are displayed on the main screen 4300. However, this should not be considered as limiting. The icons 4310-3 and 4310-4 related to the mobile device 100 may be displayed only when a navigation function is executed in the terminal apparatus 200 or a menu to check a current location is selected.

Figure 44:
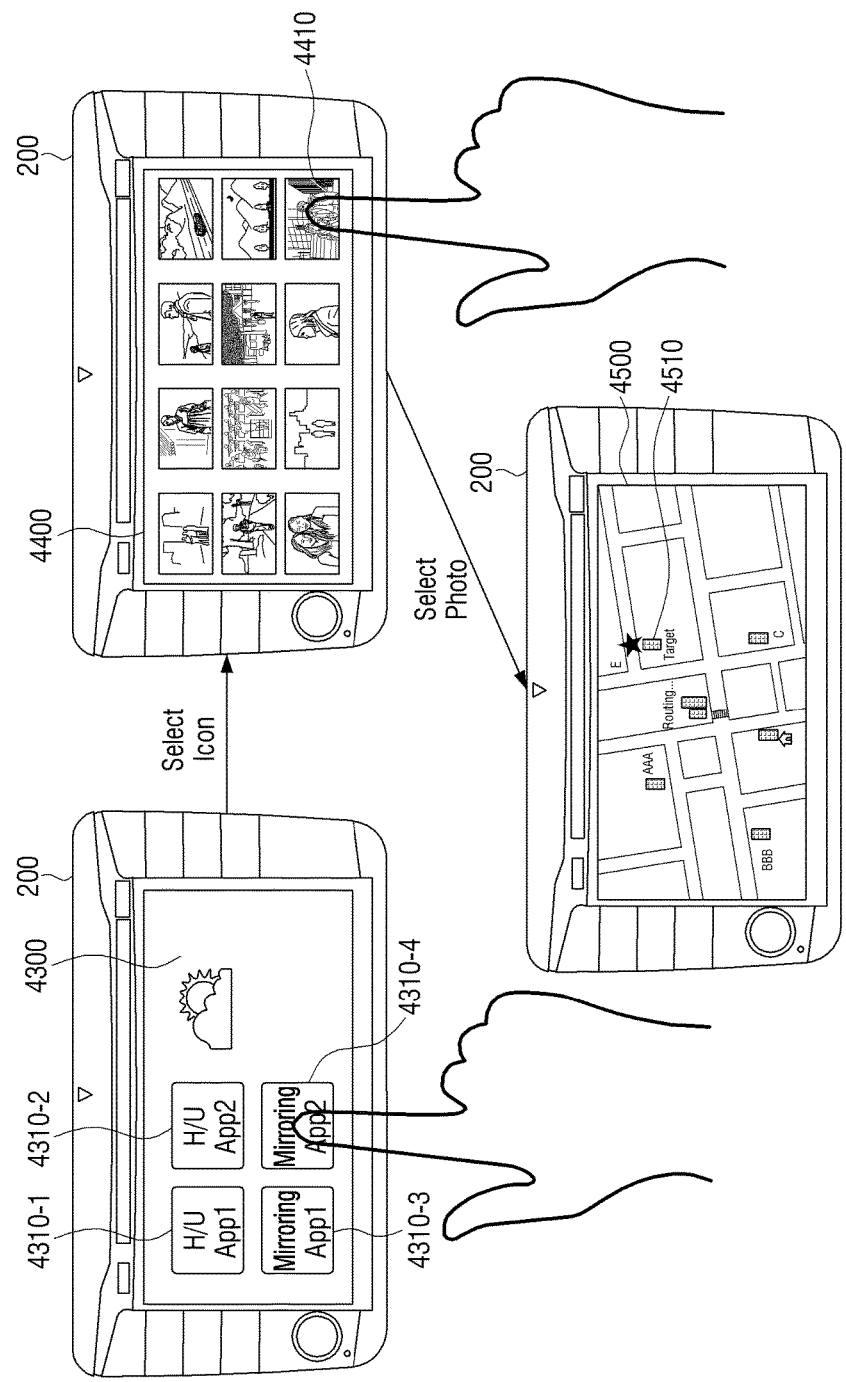
FIG. 44 is a view illustrating a configuration example of a screen of a terminal apparatus according to the method of FIG. 46.

FIG. 44 illustrates change in the screen when one 4310-4 of the icons related to the mobile device 100 is selected on the main screen 4300 of the terminal apparatus 200. In FIG. 44, it is assumed that the icon 4310-4 corresponding to the gallery program is selected. In this case, a screen 4400 including thumbnail images regarding various contents managed by the gallery program is displayed on the terminal apparatus 200. That is, the mobile device 100 may configure a screen of contents managed by the gallery program and may provide the screen to the terminal apparatus 200. In this state, when the user selects one image 4410, the terminal apparatus 200 detects location information from metadata corresponding to the selected image 4410. The controller 3120 of the terminal apparatus 200 automatically sets the detected location information as a destination 4510, and displays a navigation screen 4500 to navigate to the destination.

Figure 45:
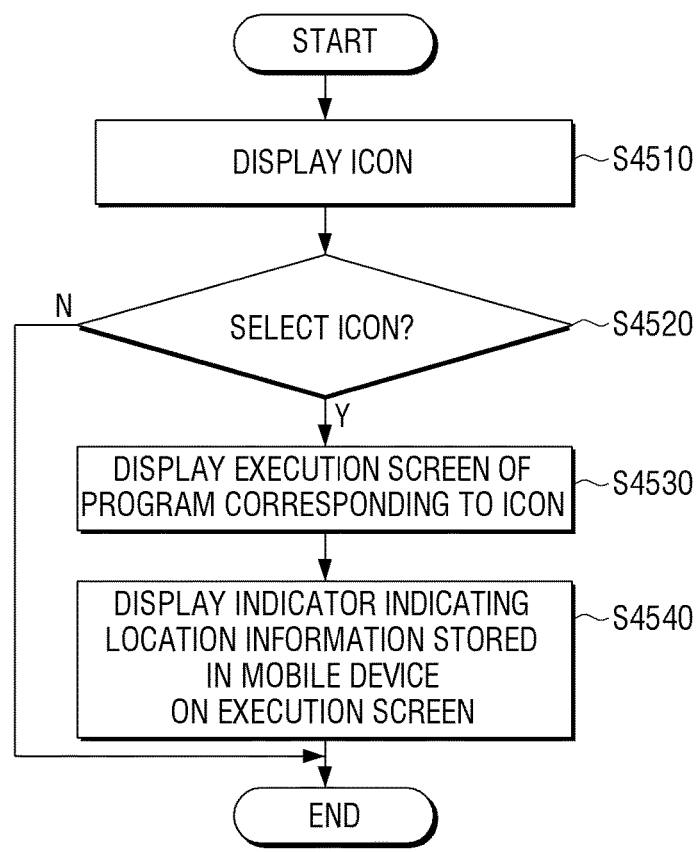
FIG. 45 is a flowchart illustrating another example of the operation of the vehicle control system of FIG. 41.

FIG. 45 is a flowchart illustrating a method for using metadata according to still another exemplary embodiment. Referring to FIG. 45, the terminal apparatus 200 displays icons corresponding to already installed applications (S4510). In this state, when the user selects one icon (S4520), the terminal apparatus 200 displays an execution screen of a program corresponding to the selected icon (S4530). For example, when a navigation program is executed, a map screen may be displayed.

The terminal apparatus 200 may display at least one indicator corresponding to location information of metadata provided by the mobile device 100 on the execution screen (S4540). For example, when the map screen is displayed as described above, the terminal apparatus 200 may display an indicator indicating a point corresponding to each piece of location information on the map screen. Accordingly, when the user selects one of the indicators, the terminal apparatus 200 may automatically set location information corresponding to the selected indicator as a destination, and may perform a navigation function.

Figure 46:
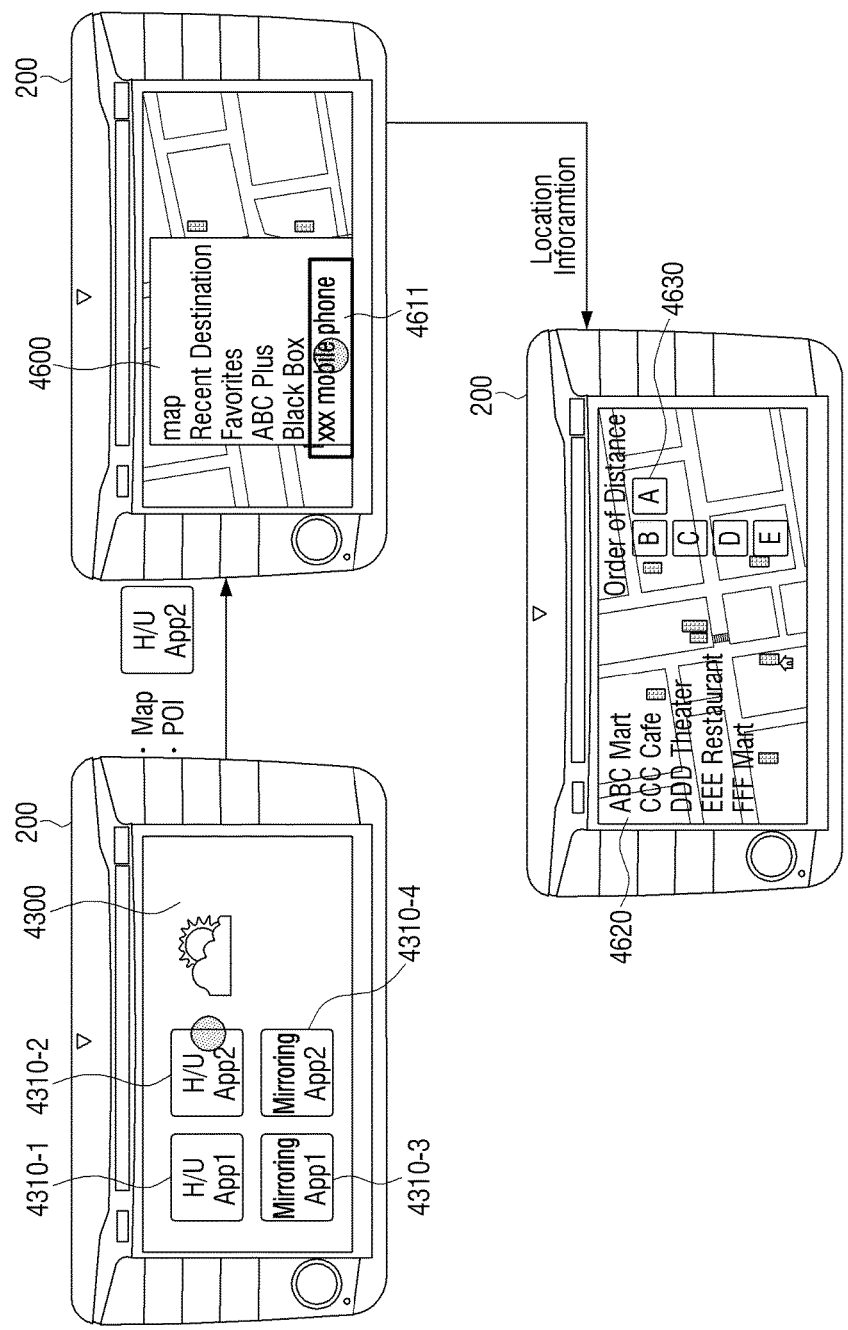
FIG. 46 is a view illustrating a configuration example of a screen of a terminal apparatus according to the method of FIG. 45.

FIG. 46 is a view illustrating a configuration example of a screen of the terminal apparatus of FIG. 45. As shown in FIG. 46, the icons 4310-1 and 4310-2 of the applications installed in the terminal apparatus 200 and the icons 4310-3 and 4310-4 corresponding to the mobile device 100 may be displayed on the screen 4300 of the terminal apparatus 200. The icons 4310-3 and 4310-4 corresponding to the mobile device 100 may include icons indicating a variety of information stored in the mobile device, as well as icons corresponding to the applications installed in the mobile device 100. For example, the mobile device 100 may store various personal profile information such as photos, a list of addresses, schedule information, a wish list, a region that the user has visited, etc.

The user may select a certain icon from among the icons displayed on the screen 4300. In FIG. 46, the icon 4310-2 of the application installed in the terminal apparatus 200 is selected. When it is assumed that the selected icon 4310-2 is an icon corresponding to a navigation program, the terminal apparatus 200 displays a map screen 4600 and displays a list of selectable menus 4610 on the map screen 4600. The list of menus 4610 includes a menu 4611 corresponding to the mobile device 100.

In this state, when the user selects the menu 4611, indicators 4620 and 4630 based on a variety of information stored in the mobile device 100 are displayed. Referring to FIG. 46, text 4620 indicating a variety of location information stored in the mobile device 100 and icons 4630 of applications in which the location information is used are superimposed on the map screen 4600 and displayed. When the user selects such text or icon, the terminal apparatus 200 automatically sets location information corresponding to the selected text or icon as destination, and performs a navigation function to navigate to the set destination.

According to the present exemplary embodiment described above, the terminal apparatus 200 may provide various services using the metadata provided by the mobile device 100.

According to the various exemplary embodiments described above, the mobile device 100 controls the terminal apparatus 200 and also provides various services by being interlocked with the terminal apparatus 200. The mobile device 100 may be implemented by using various kinds of products such as a mobile phone, a tablet PC, a PDA, an MP3 player, a notebook PC, etc., and the terminal apparatus 200 may be implemented by using a vehicle head unit mounted in a vehicle, or a navigation apparatus mountable in and dismountable from a vehicle. Also, the terminal apparatus 200 may be implemented by using a portable apparatus such as a mobile phone, a tablet PC, a PDA, an MP3 player, a notebook PC, etc.

Hereinafter, an overall configuration of a mobile device 100 which is implemented in the form of supporting various functions such as a mobile phone or a tablet PC will be explained.

Figure 47:
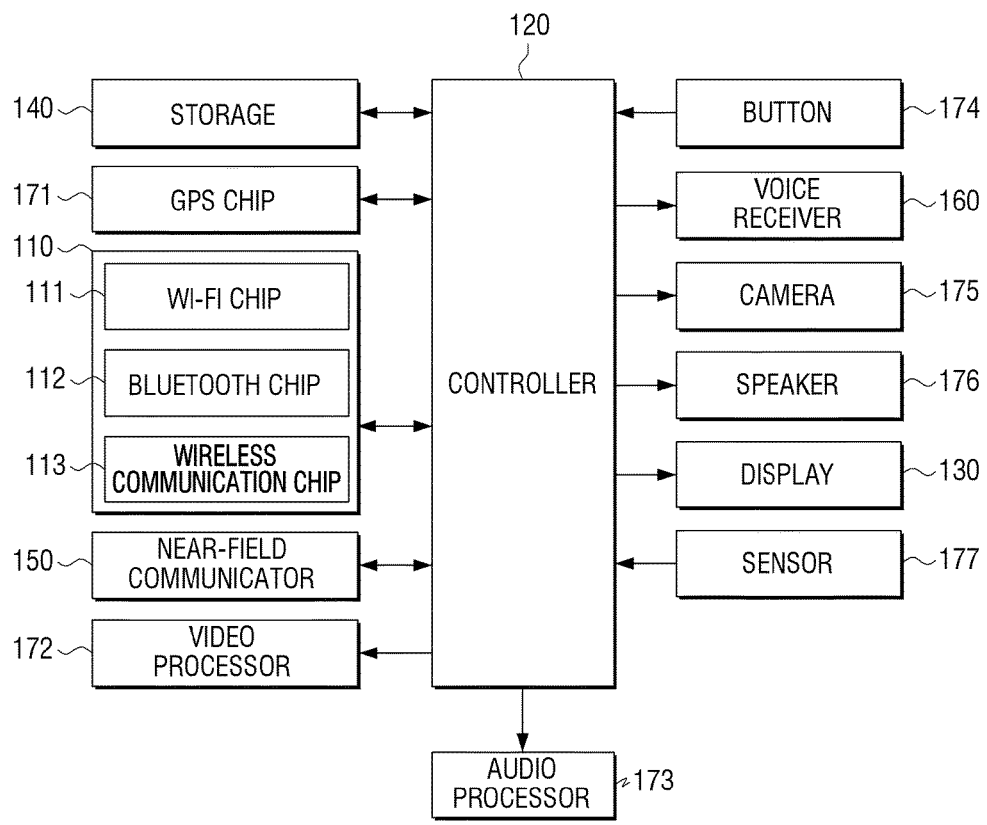
FIG. 47 is a block diagram illustrating an overall configuration of a mobile device according to various exemplary embodiments.

Referring to FIG. 47, the mobile device 100 includes a communicator 110, a controller 120, a display 130, a storage 140, a near-field communicator 150, a voice receiver 160, a GPS chip 171, a video processor 172, an audio processor 173, a button 174, a camera 175, a speaker 176, and a sensor 177.

The sensor 177 is an element for sensing a user's touch manipulation on the display 130. The sensor 177 may include a touch sensor. The display 130 and the sensor 177 may be integrally formed with each other, thereby forming a single touch screen. Accordingly, the sensor 177 senses a user manipulation performed on a surface of the display 130, and notifies the controller 120 of a result of the sensing.

The controller 130 controls an overall operation of the mobile device 100 using various programs and data stored in the storage 140. A detailed operation of the controller 130 may be performed differently according to the above-described exemplary embodiments.

The communicator 110 is an element for communicating with various kinds of external apparatuses including the terminal apparatus 200 in various communication methods. The communicator 110 may include a Wi-Fi chip 111, a Bluetooth chip 112, a wireless communication chip 113, etc.

The Wi-Fi chip 111 and the Bluetooth chip 112 perform communications in a Wi-Fi method and a Bluetooth method, respectively. When the Wi-Fi chip 111 or the Bluetooth chip 112 is used, a variety of connection information such as an SSID and a session key is exchanged first and communication is established using the connection information, and then, a variety of information is exchanged. The wireless communication chip 113 is a chip for communicating with external apparatuses according to various communication standards such as IEEE, Zigbee, $3^{rd}$ generation (3G), $3^{rd}$ generation partnership project (3GPP), long term evolution (LTE), etc.

The near-field communicator 150 is an element for exchanging data with external apparatuses including the terminal apparatus 200 in a near field communication (NFC) method. The NFC method refers to a method for exchanging data using a band of 13.56 MHz from among various RF-ID frequency bands such as 135 kHz, 13.56 MHz, 433 MHz, 860~960 MHz, and 2.45 GHz. The controller 120 may receive information like a URL of the terminal apparatus 200 through the near-field communicator 150, access the URL, and receive a control UI on the terminal apparatus.

As described above, the controller 120 communicates with various external apparatuses using the communicator 150. Accordingly, the operations as described in the above-described exemplary embodiments may be performed.

The GPS chip 171 is an element for receiving a GPS signal from a GPS satellite and calculating a current location of the mobile device 100. When a navigation function is selected, the controller 120 may determine a current location of the mobile device 100 using the GPS chip 171 and may automatically set the current location as a starting place.

The video processor 172 is an element for processing video data included in a content received through the communicator 150 or a content stored in the storage 140. The video processor 172 may perform various image processing operations such as decoding, scaling, noise filtering, frame rate conversion, and resolution conversion with respect to the video data. When the image is a photo or moving image content, the video processor 172 performs the above-described image processing operations, thereby converting the image into a form that can be additionally displayed on the map screen.

The audio processor 173 is an element for processing audio data included a content received through the communicator 150 or a content stored in the storage 140. The audio processor 173 may perform various processing operations such as decoding, amplification, and noise filtering with respect to the audio data. The audio processor 173 may generate various voice guide messages or notice sounds necessary for executing navigation.

When a playback program for a multimedia content is executed, the controller 120 drives the video processor 171 and the audio processor 173, thereby playing back the content. The display 110 may display an image frame which is generated by the video processor 172.

The speaker 176 outputs audio data which is generated by the audio processor 173. In particular, the speaker 176 may output various voice guide messages or notice sounds while executing navigation.

The button 174 may be implemented by using various kinds of buttons such as a mechanical button, a touch pad, and a wheel, which are formed on a certain area of the mobile device 100, such as a front surface, a side surface, and a bottom surface of a body exterior of the mobile device 100. Although only one button 174 is shown, the mobile device 100 may be implemented with a plurality of buttons.

The voice receiver 160 is an element for receiving input of a user voice or other sounds and converting it into audio data. As described above, according to the exemplary embodiment in which the terminal apparatus 200 is controlled according to a user voice, the controller 120 may analyze the user voice which is input through the voice receiver 160 and may perform a control operation corresponding to the voice.

The camera 175 is an element for photographing a still image or a moving image under the control of the user. The camera 175 may include a plurality of cameras like a front camera and a rear camera.

When the camera 175 and the voice receiver 160 are provided, the controller 120 may perform a control operation according to the user voice which is input through the voice receiver 160 or a user motion which is recognized by the camera 175. That is, the mobile device 100 may operate in a motion control mode or a voice control mode. In the motion control mode, the controller 120 activates the camera 175 and photographs the user, traces a change in the motion of the user, and performs a corresponding control operation. In the voice control mode, the controller 120 may operate in a voice recognition mode in which the controller 120 analyzes the user voice which is input through the voice receiver 160 and performs a control operation according to the analyzed user voice.

Although not shown in FIG. 47, according to exemplary embodiments, the mobile device 100 may further include a USB port through which a USB connector is connected with the mobile device 100, various external input ports to be connected with various external terminals such as a headset, a mouse, a local area network (LAN), etc, and a digital multimedia broadcasting (DMB) chip to receive and process a DMB signal.

The above-described exemplary embodiments have been described separately. However, at least one exemplary embodiment may be implemented altogether. For example, the mobile device may include a display 130, a communicator 120 to communicate with a terminal apparatus which displays items classified into a plurality of groups in the form a list, and a controller 110 to hop over the groups of the items displayed on the terminal apparatus according to a touch manipulation performed on a screen of the display when communication with the terminal apparatus is established. The method of the user's touch manipulation and a corresponding hopping operation have been described in detail in the above-described exemplary embodiments, and thus a redundant explanation is omitted.

An exemplary embodiment in which location data is used may be combined with this exemplary embodiment as described above. In this case, the mobile device 100 may further include a storage 140 to store metadata including location information, and the controller 120 provides the metadata to the terminal apparatus 200 such that a service screen based on the location information of the metadata is displayed on the terminal apparatus 200. The exemplary embodiment in which the service is provided using the metadata has been described above in detail and thus a redundant explanation is omitted.

Also, an exemplary embodiment in which the operation of the terminal apparatus is controlled using a user voice may be combined. Specifically, the mobile device 100 may further include a voice receiver to receive input of a user voice. When the user voice is input, the controller 120 may set a search criterion differently according to a user state. The controller 120 may search for at least one destination corresponding to the user voice using the set search criterion, and may provide a result of the searching to the terminal apparatus 200 through the communicator 110.

When the user is driving, the controller 120 may set a search criterion so that a destination providing a vehicle-related service is searched first. When the mobile device 100 further includes the storage 140 in which user schedule information is stored, the controller 120 may check a user's next schedule based on the user schedule information, and, when there is a next schedule, the controller 120 may set a search criterion so that the destination is searched according to a next schedule time or place.

On the other hand, when address information of the terminal apparatus is received from the terminal apparatus 200, the controller 120 may access a server apparatus corresponding to the address information, receive web page data, configure an adaptive screen for the terminal apparatus using the web page data, and provide the screen to the terminal apparatus 200 through the communicator.

The above-described various exemplary embodiments may be implemented in the form of terminal apparatus control methods. Detailed flowcharts of those methods and explanations thereof have been provided in the above-described exemplary embodiments, and thus a redundant explanation is omitted.

According to the various exemplary embodiments described above, various operations may be performed by interlocking the mobile device and the terminal apparatus which is mountable in the vehicle with each other. Accordingly, the user can use the services more safely and easily.

The terminal apparatus control methods or the service providing methods according to the above-described various exemplary embodiments may be coded as software and may be stored in a non-transitory readable medium. The non-transitory readable medium may be mounted in various apparatuses and used.

Specifically, a program code for performing a control method including: communicating with a terminal apparatus which displays items classified into a plurality of groups in the form of a list, sensing a touch manipulation performed on a screen of a display of the mobile device, and controlling to hop over the groups of the items displayed on the terminal apparatus according to the touch manipulation, may be stored in a non-transitory readable medium and may be provided.

The non-transitory readable medium refers to a medium that stores data semi-permanently rather than storing data for a very short time, such as a register, a cache, and a memory, and is readable by an apparatus. Specifically, the non-transitory readable medium may be a compact disc (CD), a digital versatile disk (DVD), a hard disk, a Blu-ray disk, a universal serial bus (USB) flash drive, a memory card, a read only memory (ROM), and etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A mobile device comprising:
a display comprising a screen;
a communicator configured to communicate with a terminal apparatus configured to display items classified into a plurality of groups in a form of a list; and
a controller configured to, when the mobile device is connected with the terminal apparatus through the communicator, control the mobile device to operate in a touch control mode that the terminal apparatus hops over one or more groups of the items displayed on the terminal apparatus according to a touch manipulation performed on the screen of the display, and
wherein, according to a predetermined touch manipulation performed on the screen of the display, the controller is further configured to change a mode of operation to a handwriting recognition mode, and, according to a text being drawn on the screen of the display while in the handwriting recognition mode, the controller is further configured to control the terminal apparatus to hop to a group corresponding to the drawn text and display at least one item belonging to the hopped to group.

2. The mobile device as claimed in claim 1, further comprising:
wherein, according to the touch manipulation performed on the screen of the display, the controller is configured to control the terminal apparatus to hop from the group of the items displayed on a screen of the terminal apparatus to a previous group or a next group, and to display at least one item belonging to the hopped to group.

3. The mobile device as claimed in claim 1, wherein, on a condition that the mode of operation is changed to the handwriting recognition mode, the controller is further configured to cause the display to display an affordance GUI to guide the user to perform user drawing on the display.

4. The mobile device as claimed in claim 1, wherein, on a condition that user drawing is not input for a predetermined time after the mode is changed to the handwriting recognition mode, the controller is further configured to return the mode of operation to the touch control mode.

5. The mobile device as claimed in claim 1, further comprising a storage configured to store metadata comprising location information,
wherein the controller is further configured to provide the metadata to the terminal apparatus such that a service screen based on the location information of the metadata is displayed on the terminal apparatus.

6. The mobile device as claimed in claim 1, further comprising a voice receiver configured to receive input of a user voice,
wherein, on a condition that the user voice is input, the controller is further configured to set a search criterion differently according to a user state, to search for at least one destination corresponding to the user voice using the set search criterion, and to provide a result of the searching to the terminal apparatus through the communicator.

7. The mobile device as claimed in claim 6, wherein, on a condition that the user is driving a vehicle, the controller is further configured to set a search criterion so that a destination providing a service related to the vehicle is searched first.

8. The mobile device as claimed in claim 6, further comprising a storage configured to store user schedule information,
wherein the controller is further configured to check a next schedule of the user based on the user schedule information, and, on a condition that there is the next schedule, the controller is further configured to set a search criterion based on a time or a place of the next schedule.

9. The mobile device as claimed in claim 1, wherein, on a condition that address information is received from the terminal apparatus, the controller is further configured to access a server apparatus corresponding to the address information, receive web page data, configure an adaptive screen for the terminal apparatus using the web page data, and provide the screen to the terminal apparatus through the communicator.

10. A method for controlling a terminal apparatus of a mobile device, the method comprising:
communicating with a terminal apparatus configured to display items classified into a plurality of groups in a form of a list;
controlling the mobile device to operate in a touch control mode;
controlling the terminal apparatus to hop over the groups of the items displayed on the terminal apparatus according to a touch manipulation in response to the touch manipulation being performed on a screen of a display of the mobile device in the touch control mode;
changing a mode of operation to a handwriting recognition mode in response to a predetermined touch manipulation being performed on the screen of the display of the mobile device;
controlling the terminal apparatus to hop to a group corresponding to a drawn text in response to the text being drawn on the screen of the display in the handwriting recognition mode and display an item belonging to the hopped to group.

11. The method as claimed in claim 10, wherein the controlling comprises, in response to the touch manipulation being sensed, controlling the terminal apparatus to hop from the group of the items displayed on a screen of the terminal apparatus to a previous group or a next group, and to display an item belonging to the hopped to group.

12. The method as claimed in claim 10, further comprising, in response to the mode of operation being changed to the handwriting recognition mode, displaying an affordance GUI on the display to guide the user to perform user drawing on the display.

13. The method as claimed in claim 10, further comprising, in response to user drawing not being input for a predetermined time after the mode is changed to the handwriting recognition mode, retuning the mode of operation to the touch control mode.

14. The method as claimed in claim 10, further comprising providing metadata comprising location information to the terminal apparatus, and displaying a service screen based on the location information of the metadata on the terminal apparatus.

15. The method as claimed in claim 10, further comprising:
receiving a user voice;
setting a search criterion differently according to a user state;
searching for at least one destination corresponding to the user voice using the set search criterion; and
providing a result of the searching to the terminal apparatus.

16. The method as claimed in claim 15, wherein the setting the search criterion comprises, on a condition that the user is driving a vehicle, setting a search criterion so that a destination providing a service related to the vehicle is searched first.

17. The method as claimed in claim 15, wherein the setting the search criterion comprises, on a condition that there is a next schedule of the user, setting a search criterion so that the destination is searched according to a time or a place of the next schedule.

18. The method as claimed in claim 10, further comprising:
in response to web address information being received from the terminal apparatus, accessing a server apparatus corresponding to the web address information, and receiving web page data;
configuring an adaptive screen for the terminal apparatus using the web page data; and
providing the adaptive screen to the terminal apparatus.

19. The mobile device as claimed in claim 1, a display, wherein the controller is configured to control the terminal apparatus to hop over one or more groups of the items displayed on the terminal apparatus according to a touch manipulation performed on a screen of the display on a condition that the mobile device is connected with the terminal apparatus for communication.

* * * * *